(12) United States Patent
Jamail et al.

(10) Patent No.: US 6,807,138 B1
(45) Date of Patent: Oct. 19, 2004

(54) LIGHT DRIVE

(76) Inventors: John M. Jamail, 65917 Read Rd., Cambridge, OH (US) 43725; Russell H. Barnes, 1478 Berkshire Rd., Columbus, OH (US) 43221; David John Hermann, 5570 Maleka Ct., Columbus, OH (US) 43235

( * ) Notice: Subject to any disclaimer, the term of this patent is extended or adjusted under 35 U.S.C. 154(b) by 732 days.

(21) Appl. No.: 09/704,282

(22) Filed: Nov. 1, 2000

(51) Int. Cl.$^7$ .................................................. G11B 7/00
(52) U.S. Cl. ........................................ 369/108; 369/95
(58) Field of Search ................................ 369/103, 100, 369/108, 275.1, 109.1, 109.2, 288, 95

(56) References Cited

U.S. PATENT DOCUMENTS

| | | |
|---|---|---|
| 3,936,140 A | 2/1976 | Ruell |
| 4,090,031 A | 5/1978 | Russell |
| 4,649,518 A | 3/1987 | Sadjian |
| 5,228,001 A | 7/1993 | Birge et al. |
| 5,381,401 A | 1/1995 | Best et al. |
| 5,410,502 A | 4/1995 | Bird |
| 5,541,888 A * | 7/1996 | Russell ........................ 369/103 |
| 5,757,763 A | 5/1998 | Green, Jr. et al. |
| 5,838,653 A | 11/1998 | Fan et al. |

OTHER PUBLICATIONS

M. H. Pilkuhn, Molecular Electronics; New Prospects for information technology; Stuttgart University, Physics Institute, Germany, pp. 3–10.

James R. Sheats & Paul F. Barbara, Molecular Materials in electronic and optoelectronic devices; Accounts of Chemical Research, Mar. 1999, vol. 32, No. 3, pp. 191–192.

Mark A. Reed, Molecular–Scale Electronics Proceedings of the IEEE, vol. 87, No. 4, Apr. 1999, pp. 652–658.

Michael D. Ward, Current developments in molecular switches, 6 pages.

Yasushi Yokoyama et al., Diastereoselective Photochromism of an (R)–Binaphthol–Condensed Indolylfulgide, J. Am. Chem. Soc. 1996, 118, 3100–3107.

J. Walz et al., Fulgides as switches for intramolecular energy transfer, Chemical Physics Letters, vol. 213, No. 34, Oct. 8, 1993, pp. 321–324.

Gerasimos M. Tsivgoulis et al., Photoswitched and Functionalized Oligothiophenes: Synthesis and photochemical and electrochemical properties. Chem. Eur. J. 1996. 2. No. 11. pp. 1399–1406.

Naoto Tamai et al., Femtosecond Dynamics of a Thiophene Oligomer with a Photoswitch by Transient Absorption Spectroscopy. J. Phys. Chem. 1996, 100. 4689–4692.

(List continued on next page.)

*Primary Examiner*—Thang V. Tran
(74) *Attorney, Agent, or Firm*—Frank H. Foster; Kremblas, Foster, Phillips & Pollick

(57) ABSTRACT

Typical apparatus according to this invention comprises a host interface for receiving digital data interface input from a host computer and delivering digital data interface output to the host computer, the interface output data comprising a function of the interface input data; an optical storage device (herein sometimes called a "light drive") for receiving the interface output data from the host interface and providing optical radiation (i.e. radiation of wavelength in the range at least of about ultraviolet to at least about infrared) to each of a series of pixels in a region of a member comprising an effective concentration of photoreceptive material (PRM) and wherein the wavelength and intensity of the radiation in each pixel are functions of the interface output data received from the host interface; and a transmission medium for providing a datum signal from each pixel via the host interface to the host computer. The pixels typically are arranged at least predominantly in concentric rings on an at least approximately flat major surface of the member comprising the PRM.

9 Claims, 14 Drawing Sheets

OTHER PUBLICATIONS

Gerasimos M. Tsivgoulis et al., Photoswitched Sexithiophenes: Forwards Switchable Molecular Wires. Advanced Materials 1997, 9, No. 1, pp. 39–42.

Andreas Stracke et al., Functualized Liquid–Crystalline Donor–Acceptor Triple Compounds Containing Azobenzene for Optical Storage, Advanced Materials 1999, 11, No. 8, pp. 667–670.

Makoto Hasegawa et al., A Dynamic Grating Using a Photochemical Phase Transition of Polymer Liquid Crystals Containing Azobenzene Derivatives. Advanced Materials 1999, 11, No. 8, pp. 675–677.

Richard W. Wagner et al., Molecular Optoelectronic Gates. J. Am. Chem. Soc. 1996, vol. 118, No. 16, pp. 3996–3997.

Ben L. Feringa et al., Chiroptical Molecular Switches. Advanced Materials 1996, 8, No. 8, pp. 681–684.

Marye Anne Fox, Fundamentals in the Design of Molecular Electronic Devices: Long–Range Charge Carrier Transport and Electronic Coupling. Accounts of Chemical Research, vol. 32, No. 3, 1999. pp. 201–207.

Weijin Li et Self–Assembled Monolayers of 7–(10–Thiodecoxy) coumarin on Gold: Synthesis, Characterization, and Photodimerization, J. Am. Chem. Soc., vol. 119, No. 31, 1997, pp. 7211–7214.

* cited by examiner

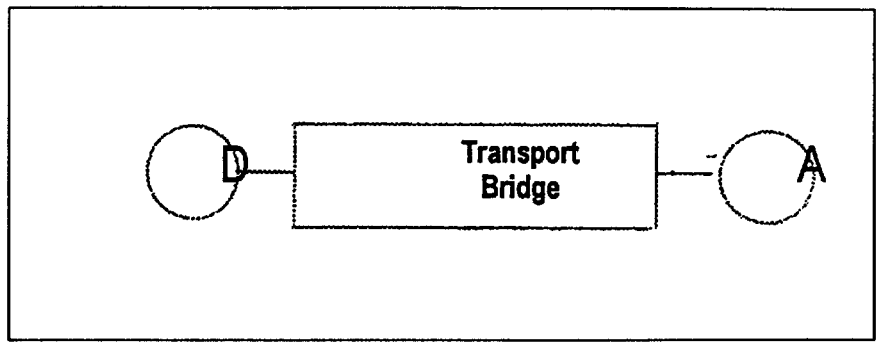
Figure 1A. Simple schematic of donor-bridge-acceptor structure for optical digital storage based on control by the bridge of energy or electron flow from the donor to the acceptor.
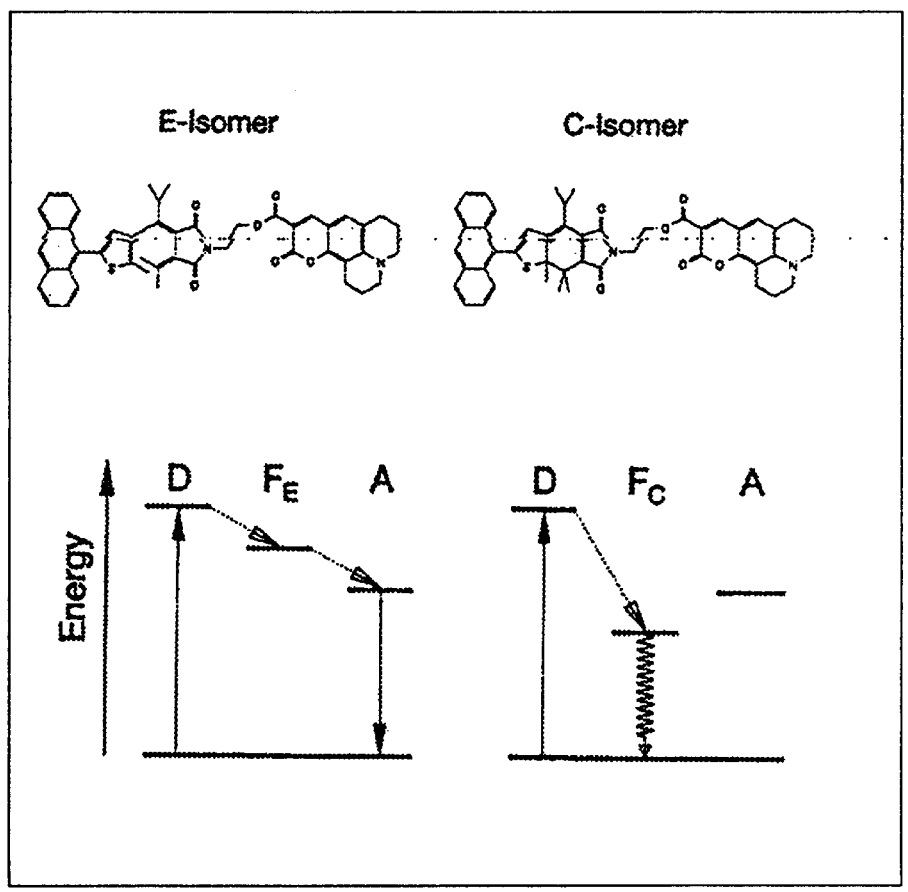
Figure 2. Concept for switching intramolecular energy transfer in a donor-fulgide-acceptor molecular system. The lowest excited state in the c-isomer drains energy from the acceptor[6].

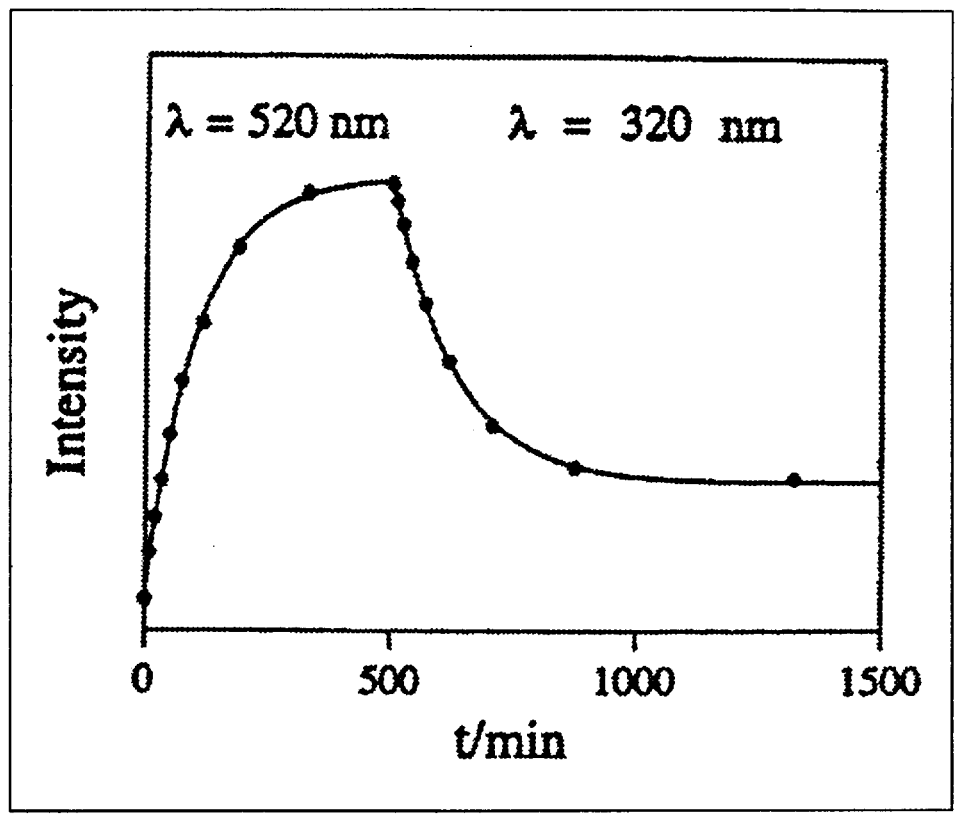
Figure 3. Fluorescence intensity variation for one switching cycle for donor-fulgide-acceptor system in Figure 2[6].
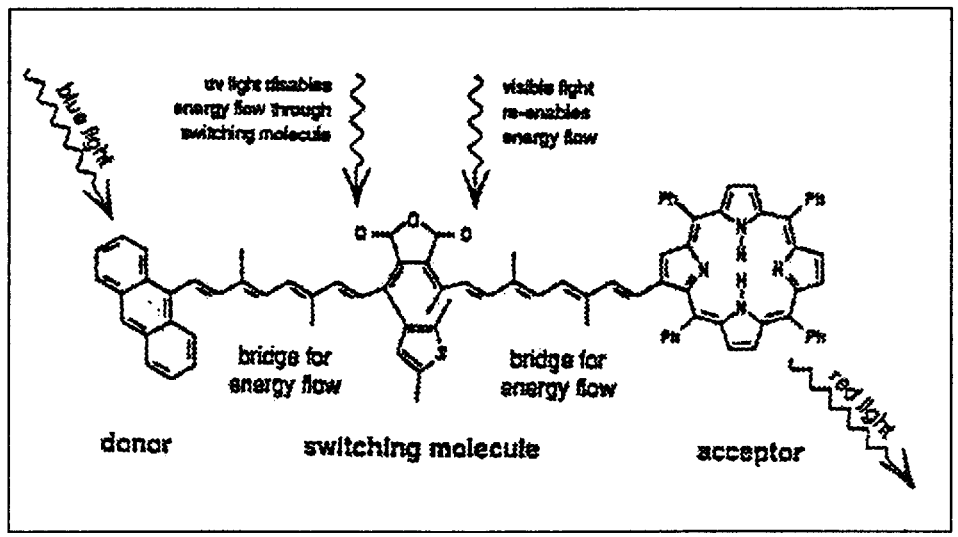
Figure 4. Donor and acceptor system with optically switchable fulgide bridge[1].

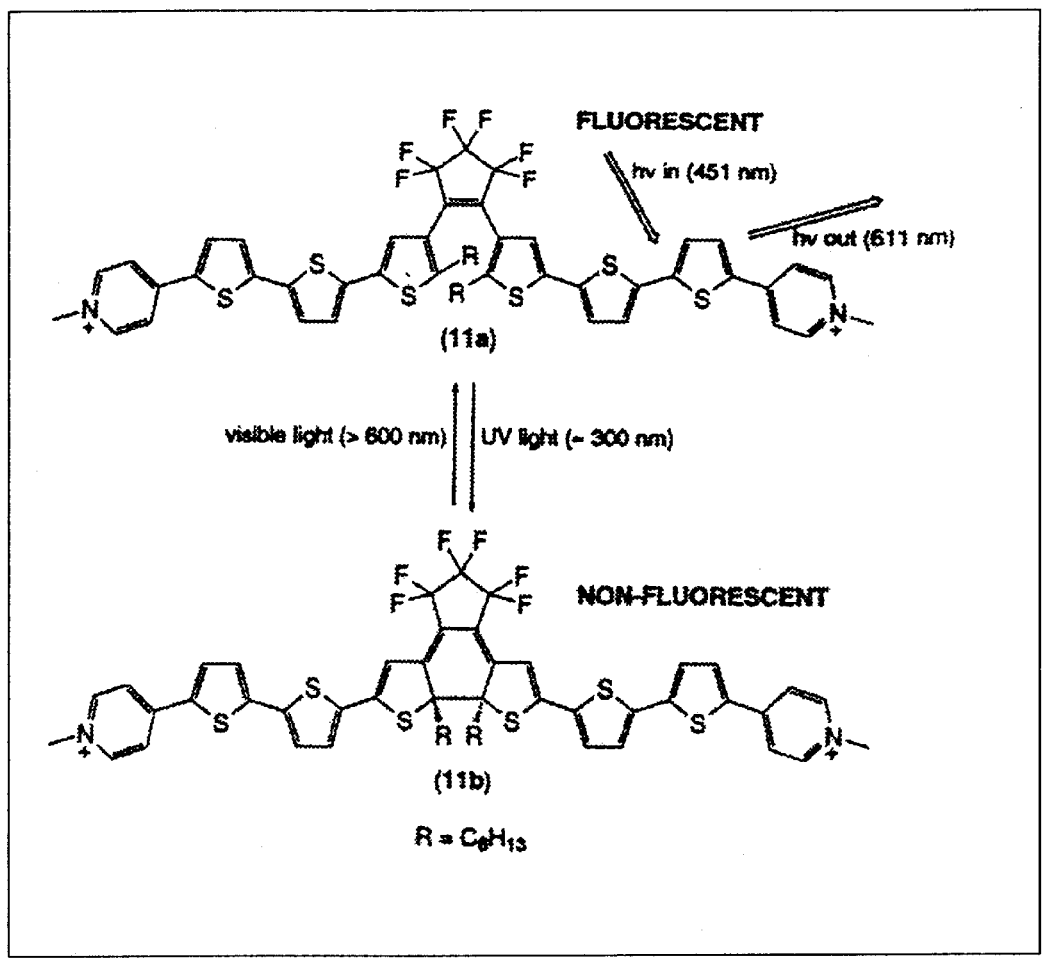
Figure 5. Optical reversible opening and closing of polythiophene ring structure for molecular switching[4].

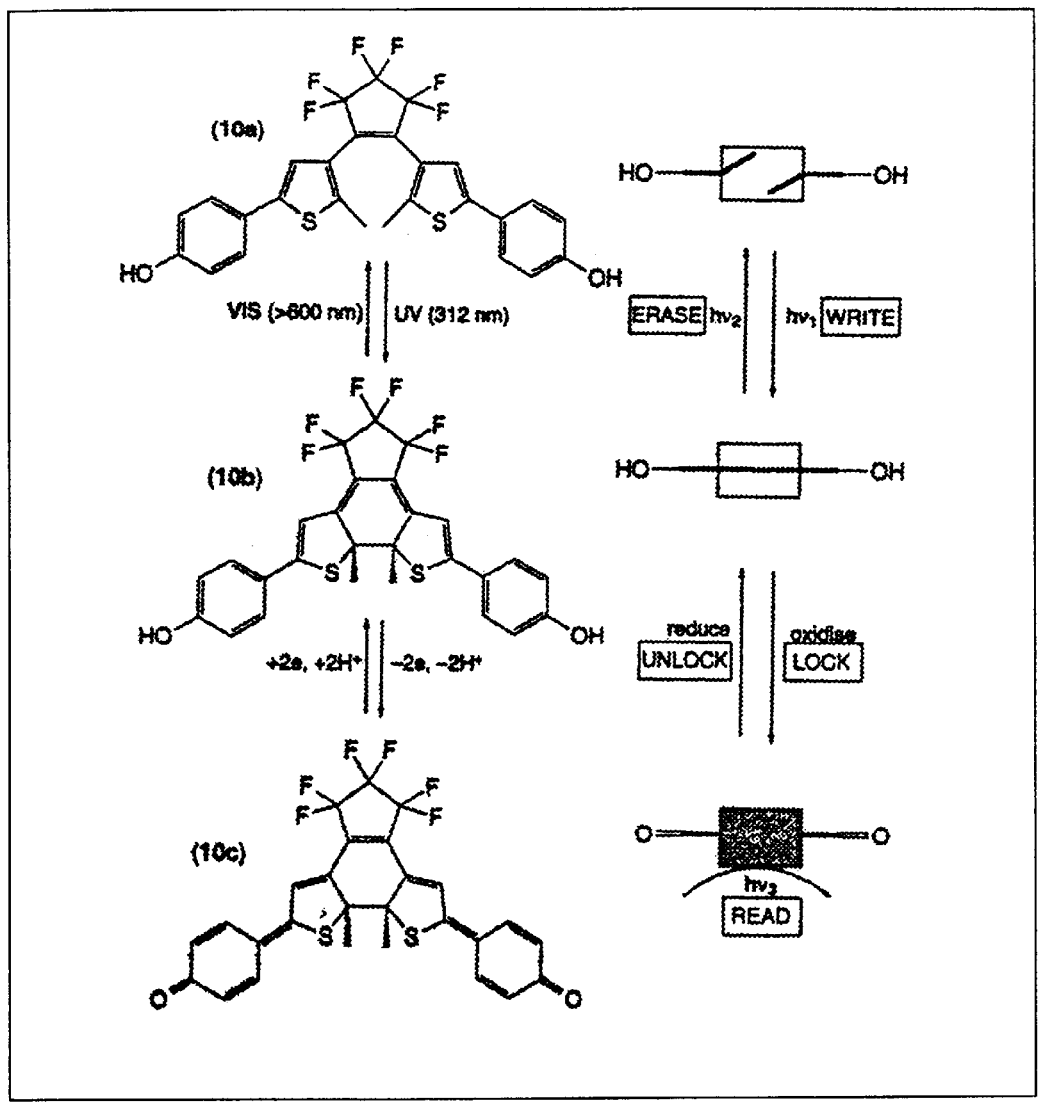
Figure 6. Erase-write-read sequence for switchable polythiophene structure with electrochemical redox lock-unlock data storage and retrieval system[4].

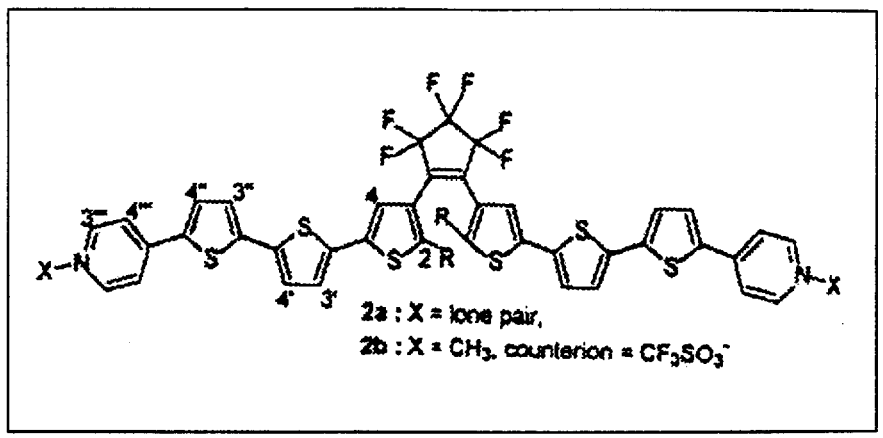
Figure 7. Structure of oligothiophene compound[7].
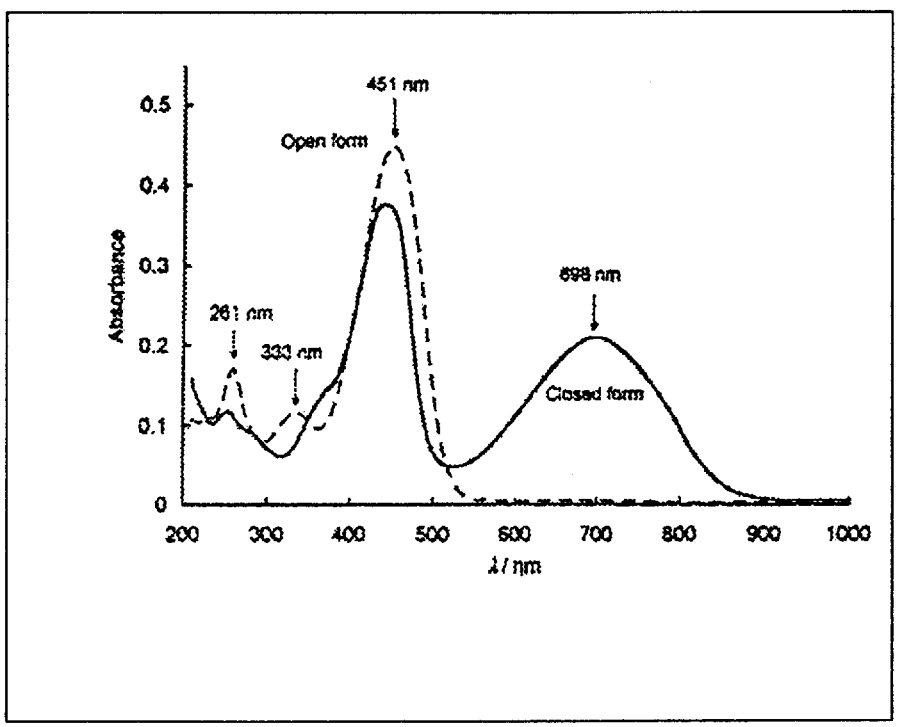
Figure 8. UV-visible absorption spectra of open and closed forms of oligothiophene compound in Figure 7 dissolved in methanol[7].

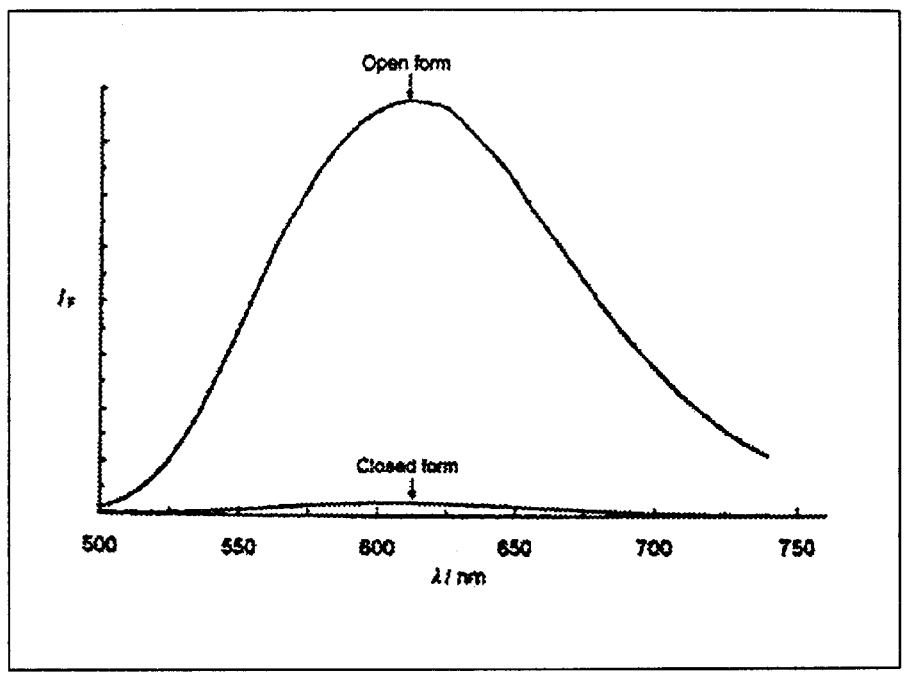
Figure 9. Fluorescence spectra excited at 451 nm from open and closed forms of oligothiophene compound in Figure 7 in methanol[7].
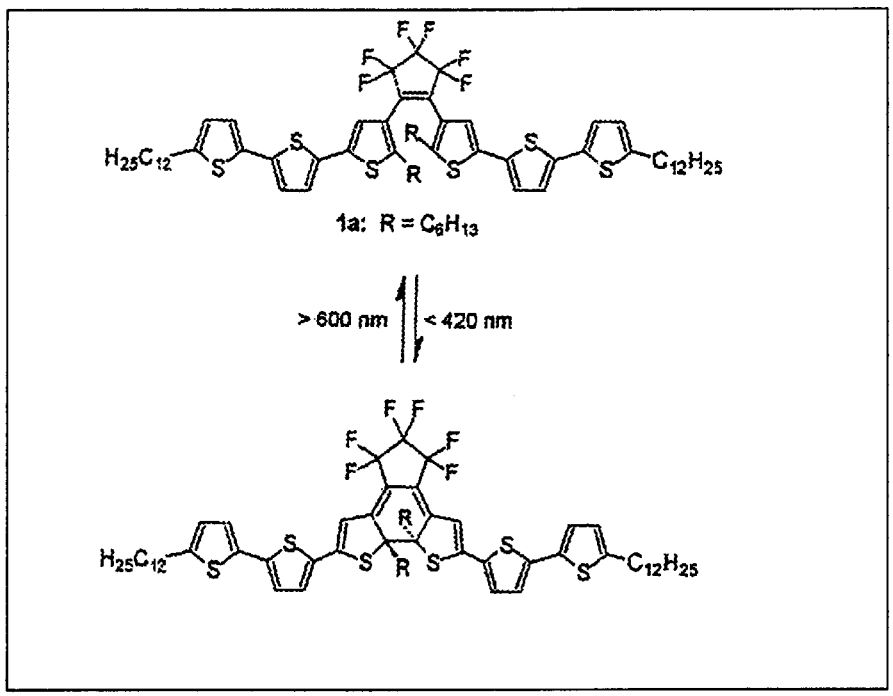
Figure 10. Structures of open and closed ring structures of sexithiophenes with interconversion wavelengths[9].

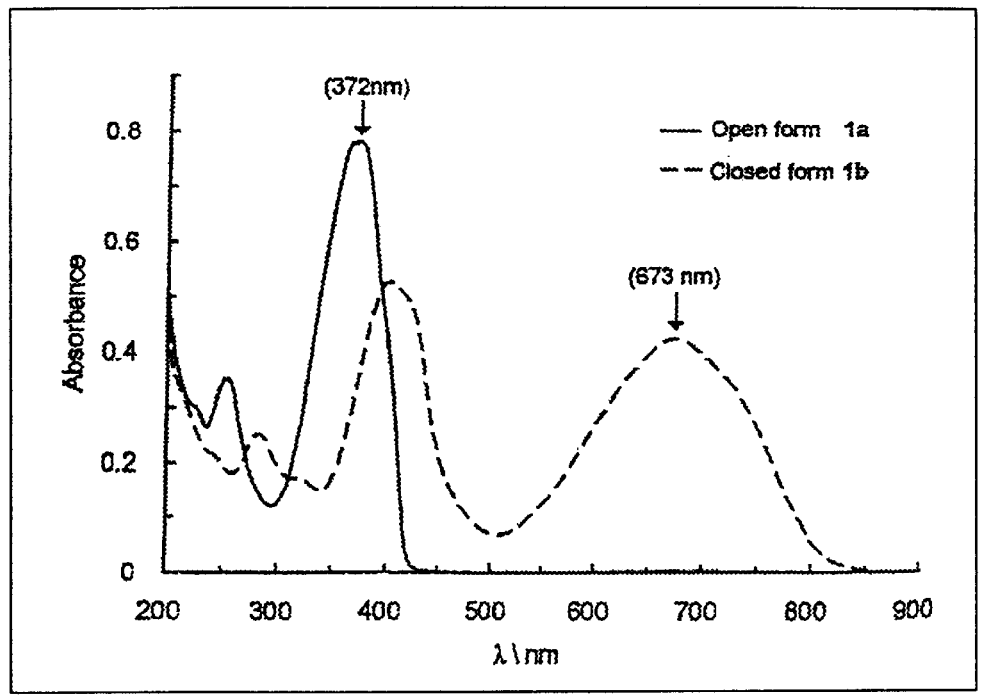
Figure 11. UV-visible absorption spectra of open and closed forms of sixithiophenes in Figure 10[9].
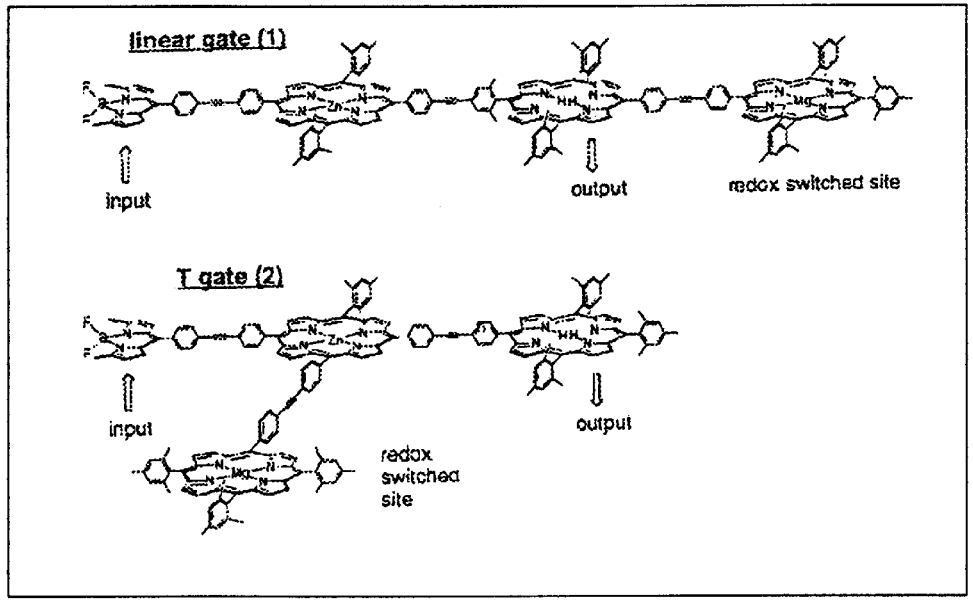
Figure 12. Linear gate and t-gate porphyrin structures with redox switching and optical readout[12].

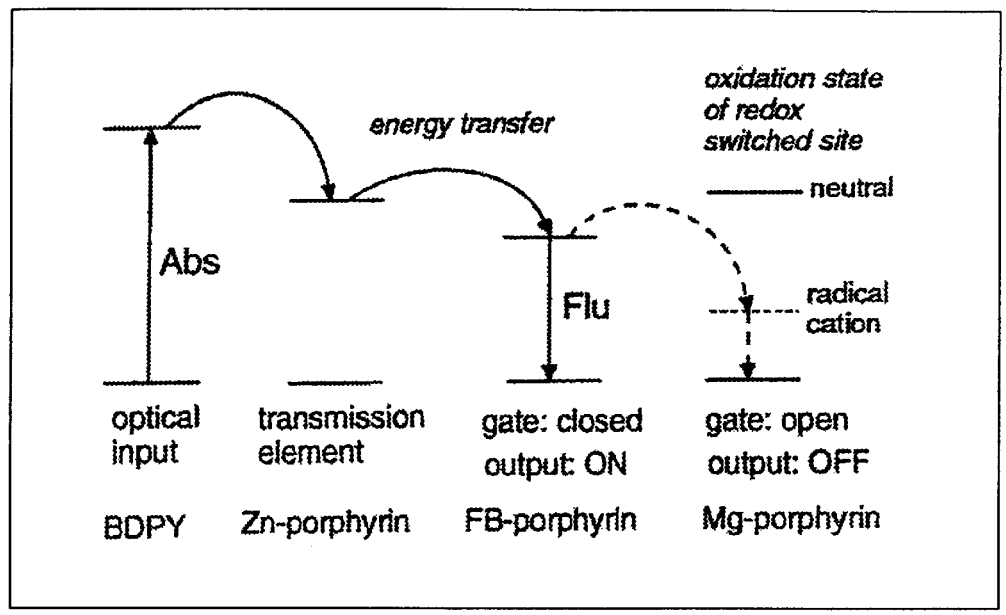
Figure 13. Energy flow with redox switching in porphyrin type structures shown in Figure 12[12].
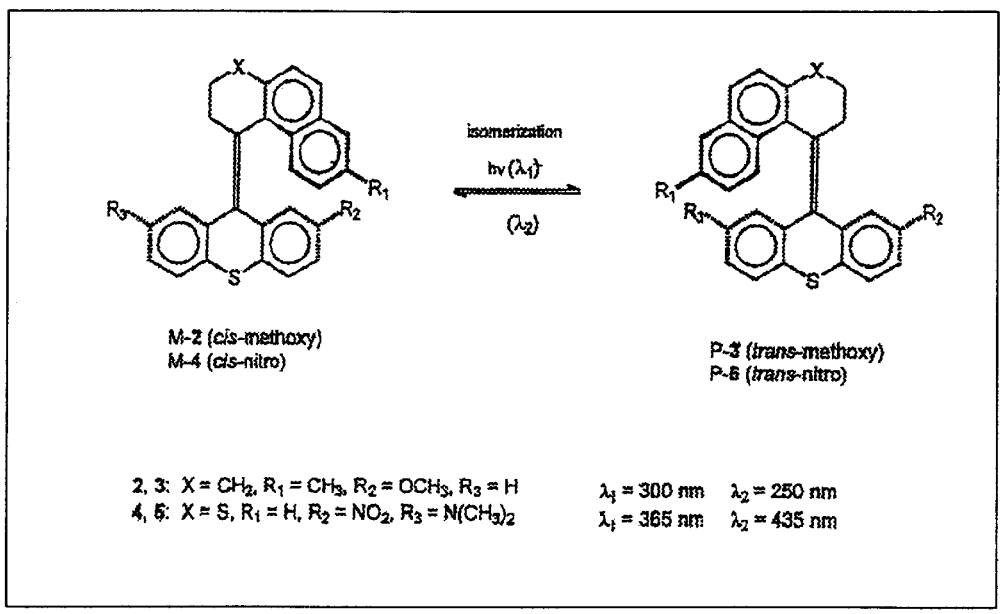
Figure 14. Optical isomerization switching of thioxanthene based alkenes[13].

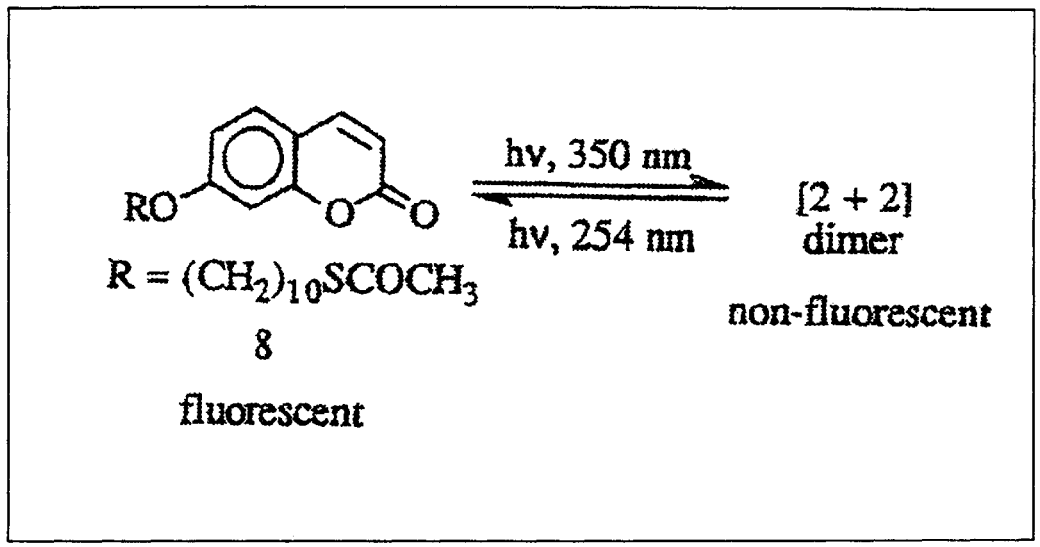
Figure 15. Optical dimerization switching of appended coumarin to form a non-fluorescent dimer[14].
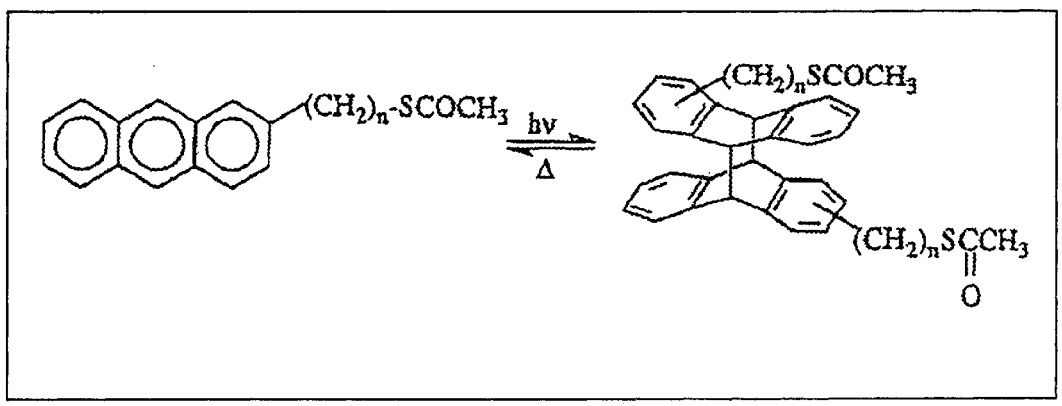
Figure 16. Photodimerization of appended anthracene with thermal reversal[14].

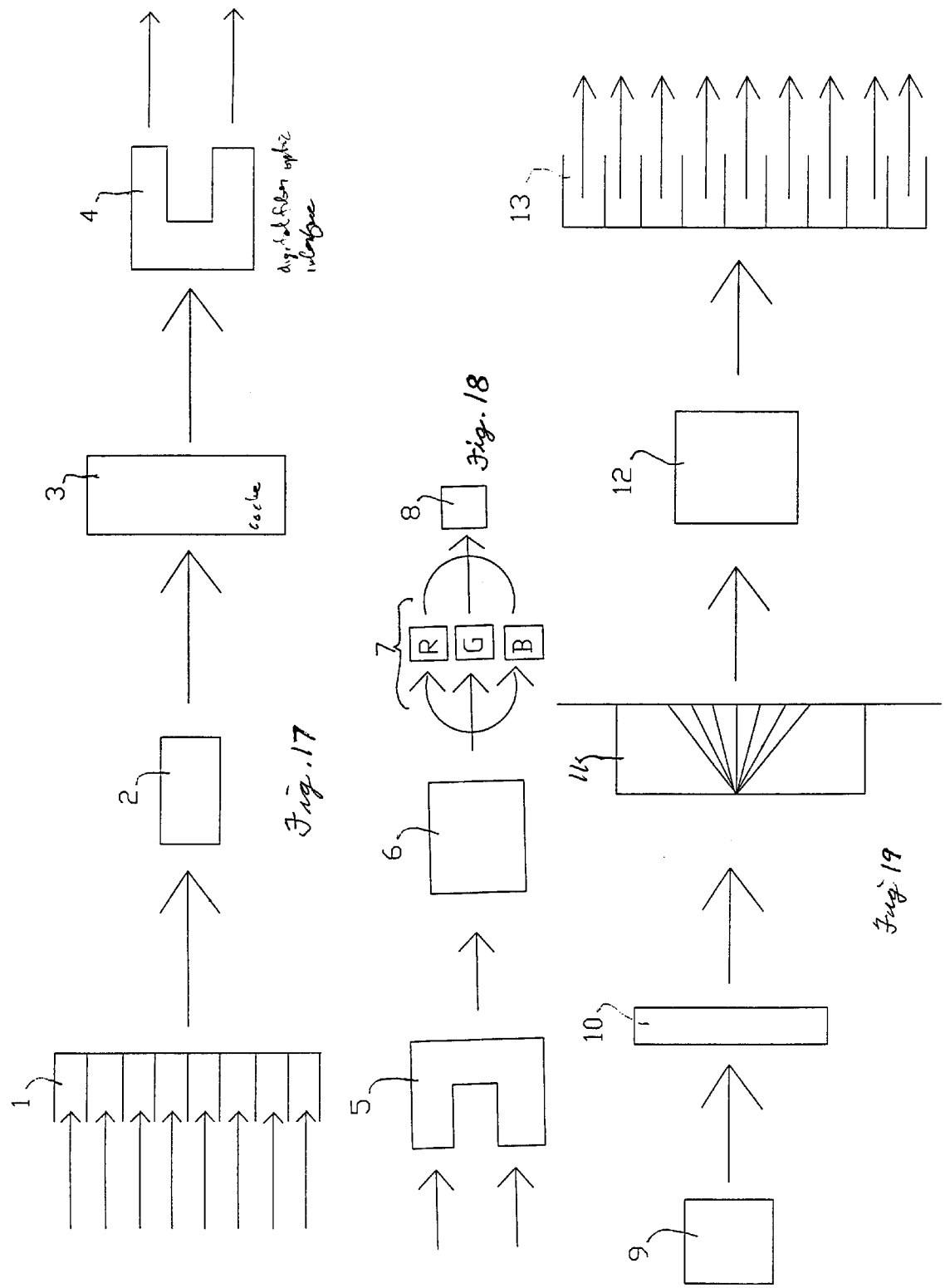

LIGHT DRIVE

FIELD

This invention relates to optical storage devices typically to replace magnetic disks in digital data processing equipment. Herein usually called the light drive, it typically is characterized by high-speed parallel access to stored data and is a medium size/power/weight device. The light drive uses an optical storage medium to retain data. A photoreceptive material (PRM) retains both wavelength and relative brightness levels of light to encode digital data.

DISCLOSURE

FIG. 1 shows schematically a conceptual diagram of the light drive. A spinning disk coated with PRM provides the data storage. Fixed read and write head arrays provide the electro-optical conversion to the PRM. The light drive includes a data formatter and host interface, both being digital circuits. A power supply is included also.

The Light Drive typically comprises four major subsystems, namely an input/output subsystem, a write subsystem, a read subsystem, and a storage subsystem. The input/output subsystem provides the data interface between the host computer and the light drive, and provides the interface to the read and write subsystems. The input/output subsystem includes the high-speed host data interface and the data formatter/multiplexer, made up of digital circuitry.

The write subsystem provides the electronic data-to-optical conversion for writing data onto the PRM, and includes a number of LED arrays or other high-density light emitting arrays. The write heads use both multiple color arrays and multiple output levels to encode optical data onto the PRM.

The read subsystem provides the optical-to-electronic data conversion for reading data from the PRM, and includes a number of high density CCD arrays or other high density detector arrays. The detector arrays are color filtered for each band of wavelength detection, and provide multiple level output.

The storage subsystem provides the optical data storage, including the spinning disk coated with PRM, and any required uninterruptable power supply (UPS). The storage subsystem includes the disk, motor, and physical mounting assembly for the light drive.

Input/Output Subsystem

The input/output subsystem requires both a host data interface and a data formatter. The host data interface provides a high-speed mass storage interface. This interface typically is an industry standard interface in the one to five gigabytes per second range. There is no pressing requirement to exceed the useful data rate of the host.

Current enabling technologies for the host data interface include Fibre Channel, both in single and multiple links. The host data interfaces typically are identical to those for high-speed magnetic disk arrays, with no unique problems for the light drive.

The data formatter buffers data for disassembly and reassembly to/from the read/write system. The data formatter multiplexes data into parallel channels, corresponding to the parallel (concentric) tracks on the disk. The formatter partitions data bits between wavelength and level prior to optical encoding, and provides the massive interconnect to the read and write subsystems. Additionally, the data formatter may need to provide a refresh capability for destructive-read PRM (see PRM section).

Current high speed digital design methodology and materials are sufficient to realize the data formatter. The multiplexing functions can be provided by current field programmable gate array (FPGA) and application specific integrated circuit (ASIC) technology. Buffering functions can be provided by current static read only memory (SROM) technology.

TABLE I

Input/Output Subsystem Technology Status

| Function | Technology | Status |
|---|---|---|
| Host data interface | Fibre Channel, etc. | Currently available |
| Data buffeting | SRAM | Currently available |
| Data multiplexing | FPGA, ASIC | Currently available |
| Data refresh | FIFO, FPGA, ASIC | Currently available |

Write Subsystem

The write subsystem typically comprises a large number of parallel tracks (T) at high-density spacing (S). A number of multiple monochromatic light sources (C) are provided at controlled brightness levels (L bits, or $2^L$ levels). The combination of all of these preferably provide a terabyte or more of storage (T×S×C×L>1 terabyte). The multiple light sources preferably have sufficiently narrow light spectra for separation at L levels. The light sources also preferably have sufficient uniformity to accurately modulate $2^L$ levels, and a high switching speed to allow a write throughput of at least about 100 megabytes per second. The write head should have sufficient light conversion efficiency to meet reasonable power requirements and should have reasonable component costs.

Write head-enabling technologies include light emitting diode (LED) linear arrays. These were originally developed by OKI Electric Industry for laser quality printers. OKI Data is currently (November 1999) in production with LED array printers at both 300 and 600 dots per inch (dpi). In July 1998, OKI developed a new fabrication process to make 1200 dpi LED arrays. The fabrication process currently limits a single array to 1200 dpi resolution. It may be possible to achieve 2400 dpi using dual offset write heads. The multi-color support of the process is not known. The 1200 dpi array is about 6% efficient, which is sufficient for this application. The approximately 3% corrected uniformity of this array allows up to four bit modulation (16 levels). OKI suggests usage at 44 kHz or more. The switching speed may not be limited by the LED technology but more by power considerations.

Typical multicolor LED technology limits the Light Drive to five colors maximum. These are yellow (570 nm), Red (660 nm), and three infrared (850, 880, and 940 nm). It is currently not known whether other colors besides red can be fabricated into high-density arrays using the OKI process.

Another potential write head technology is organic LED (OLED). Emerging OLED technology may allow higher density or more colors than current LED technology. Other flat panel display technologies currently under development may be applicable to a write head array, including field emission display (FED), gas plasma, and liquid crystal display (LCD).

TABLE II

Write Subsystem Technology Status

| Function | Technology | Status |
|---|---|---|
| Light emitter | LED array | Currently available in Red only |
| Light emitter | OLED array | >3 years to develop |

TABLE II-continued

Write Subsystem Technology Status

| Function | Technology | Status |
| --- | --- | --- |
| High resolution | LED array | 1200 dpi currently available |
| High resolution | LED array | 2400 dpi within 2 years |
| Multi-color | LED array | Possibly 3 colors within 3 years |
| >5 colors | LED array | Never |
| Multiple levels | On-chip correction | Currently allows 4-bit modulation |
| Multiple levels | On-chip correction | 6 to 8 bits within 3 years |
| Speed | LED array | Currently at least 44 kHz |
| High speed | LED array | Much faster possible (power?) |

Read Subsystem

The read subsystem typically comprises a large number of parallel tracks (T) at high density spacing (S), and some multiple filtered light detectors (C) with sufficient detection levels (typically L bits, or $2^L$ levels). The combination of all of these should provide a terabyte or more of storage (T×S×C×L>1 terabyte). The multiple filtered detectors should have sufficiently narrow light spectra for separation at L levels, with sufficient uniformity and low noise to accurately detect $2^L$ levels. The detectors should have a high enough sensing speed to allow a read throughput of at least about 100 megabytes per second. The read head should have sufficient sensitivity to match PRM output, and should have reasonable component costs.

The read head enabling technologies typically include charge coupled device (CCD) linear arrays, contact image sensors (CIS), and a unique LED read/write head. The CCD-based read head typically uses multiple color filtered monochrome arrays. The CCDs have a wide dynamic range (typically about 10,000:1) and high sensitivity (typically about 0.6 $\mu J/cm^2$ for 100% output). Current CCDs are high density with pixels typically sized down to about 6.5 $\mu m$ square. Current CCDs, however, are not high-speed devices. The fastest available CCD array provides about 13.6 kHz line rate. Thus, current CCD technology makes the light drive read-side speed somewhat limited. Also, the pitch of current CCDs typically does not match the LED-based write head.

CIS devices are similar to CCDs and are available in about the same size and pitch as LED arrays. CISs are rather slow, perhaps too slow for best results with the light drive. OKI developed an LED read/write head for a low cost FAX (facsimile) application in April 1997. This device has similar read characteristics to a CIS. Other potential read head technologies include photodiode arrays, phototransistor arrays, and higher speed CCD technologies.

TABLE III

Read Subsystem Technology Status

| Function | Technology | Status |
| --- | --- | --- |
| Light sensor | CCD array | Currently available |
| Light sensor | CIS array | Currently available (too slow) |
| Light sensor | LED array | Currently available (too slow) |
| High speed | CCD array | Within 2 years |

Storage Subsystem

The storage subsystem typically comprises a PRM, spinning disk substrate, and optionally a UPS. The PRM retains both relative wavelengths of light and relative light levels for data storage.

The spinning disk provides a stable rotating surface for the PRM. A prototype has been designed using currently available LED arrays for the write head and CCDs for the read head, with operation typically at up to about 36 RPM for a 20-inch diameter disk. This is reasonable using current technology.

A UPS may be required to maintain the PRM memory during a power failure. One kilowatt of sustain power is considered reasonable. Power outages of several hours should be tolerated. Thus, the UPS, if needed, may require up to several kilowatt-hours of capacity, which is currently available. The UPS is not required if the PRM is self-stable.

TABLE IV

Storage Subsystem Technology Status

| Function | Technology | Status |
| --- | --- | --- |
| PRM | Unknown | Not currently available |
| Spinning disk | Electromechanical | Currently available |
| Mechanical fixture | Conventional metalwork | Currently available |
| UPS | Battery backup | Currently available |

PRM Specifications

The PRM stores data by retaining the relative wavelengths and luminance levels of light in its material. The PRM is "exposed" during a write operation to multiple colors of light each modulated to one of M levels. Each data cell contains several bits layered in a number of colors, C. Since each color is modulated to M levels, each data cell contains C $\log_2(M)$ levels. The system typically comprises five colors at 16 levels each, for a total of 5 $\log_2(16)$=20 bits per cell.

The PRM is stimulated to emit for a read operation. The PRM either emits the same spectrum as was written, or a shifted spectrum which retains the relative wavelength information. Relative luminance is also maintained at each recovered wavelength. In either case, the brightness level information at each color is recovered without interference to allow full recovery of recorded data.

The PRM provides unlimited read/write cycles at sufficient switching speed to support at least about 100 megabytes per second throughput. It provides non-volatile storage that typically is stable for multiple years with up to 1 kW steady state power applied.

The PRM typically has a write cycle in the $\mu J/cm^2$ range for reasonable light drive power consumption. It also has a low sustain power, in the nanowatt per cell range, for cell retention; and should have reasonable emission power.

The PRM should be capable of addressable emission, because the material cannot continuously emit at the required detection level without requiring unreasonable power requirements. Thus, some mechanism typically is provided to stimulate emission.

The PRM can have either destructive or non-destructive read characteristics. With destructive read, the data typically is refreshed after each read by looping read data back to the write subsystem. This typically involves a slight complexity increase in the light drive electronics. Data is erased using dummy reads. With non-destructive read, an erase mechanism is provided prior to write operations.

PRM should be applied to and adhere to the disk surface. The PRM preferably should not require coherent (laser) sources, and should have reasonable material cost.

The identity of the preferred PRM is not yet certain. It appears that various organic compounds will be preferred.

Organic Media for Optical Memories

Organics are of considerable interest for optical storage media as they offer a wide range of features that are attractive for both permanent and erasable/rewritable memories. These attractive features for organic storage media include high stability, low melting points, low thermal conductivities, a wide variety of spectroscopic transitions, and simpler less expensive manufacturing processes. Mechanisms for optical storage of information in organic materials including polymers involves processes such as ablation, bubble formation, phase changes, color bleaching and photochromism. Generally, information is written into a medium at one wavelength and read out at another wavelength, a different polarization, or through a change in scattering or reflectivity of light.

Further details are covered briefly below on some of the mechanisms with examples of organic materials that are of interest for high-density optical storage media.

Organic Recording Media

Storage of optical information in organic media involves the switching of a bistable molecular state to another state. One important mechanism that is receiving considerable attention today is photochromism where molecules are converted between two forms, X and Y. Ultraviolet light is usually used to convert the X state to the Y state with the Y state readout at a longer, less energetic wavelength. In some cases, a third wavelength can be used to switch the Y state back to the X state. Two examples of photochromic organic compounds that operate in this mode are the dihydroindoligines[1] and 4' methoxyflavylium perchlorate [2]. These molecular switching systems operate in the write-lock-read-unlock-erase mode. A photochromic material, 1,3,3-trimethylindolkino-6'-nitrobenzopyrylospiran in polystyrene, appears promising for a 3-D optical memory[3]. Excitation at 442 nm converts the molecule to an isomer with strong absorption at 612 nm, which cannot be used for readout since absorption at that wavelength returns the molecules to the original isomer. However, the two isomers exhibit different refractive indices, which can be used for readout.

Two-step excitation at two different wavelengths or two-photon excitation of photochromism also is used for optical memories. In this mode, information may be recorded at the intersection of two light beams. An example of a two-photon approach, a naphthopyran derivative is used with an irradiation wavelength of 405 nm and erasure at 334 nm. Readout is based on a color change[4]. A number of organometallic charge-transfer compounds have been found useful for optical information storage using reflectivity changes for readout[5,6].

Biological materials in combination with polymers have been of interest for optically switchable devices. An example is the use of bacteriorhodopsin in polyvinyl alcohol [7]. Images are written in yellow light, which can be erased either by blue light which switches the yellow molecules to purple, or by yellow light, that converts the purple molecules to yellow. Dye-doped liquid-crystalline materials also are finding use for long-term optical storage media.[8,9]

Bleaching utilizes a material where the recording mechanism involves a colored/colorless transition. One example involves 6'-nitroindolinospiropyan. Radiation at 580 nm changes the colored form to colorless, which is reversed with radiation at 380 nm[10]. Two-photon polymer bleaching mechanisms also appear promising for 3-D memories[11].

Conclusions

The above information on optical memories based on organic material was intended to be brief with emphasis on recent developments. The future for optical storage media based on organic and polymeric materials appears very promising. Information on the common holographic storage media can be found in a summary by Kampf and Mergel[12].

References

[1] F. Pina, M. J. Melo, M. Maestri, R. Ballardini, and V. Balzani, "Photochromism of 4'-Methoxyflavylium Perchlorate. A "Write-Lock-Read-Unlock-Erase" Molecular Switching System," J. Am. Chem. Soc. 119, 5556 (1997).

[2] C. Weber, F. Rustemeyer, and H. Durr, "A Light-Driven Switch Based on Photochromic Dihydroindolizines" Adv. Mater. 10, 1348 (1998).

[3] A. Toriumi, J. M. Herrmann, and S. Kawata, "Nondestructive Readout of a Three-Dimensional Photochromic Optical Memory with a Near-infrared Differential Phase-Contrast Microscope," Opt. Lett. 22, 555 (1997).

[4] M. Uchida and M. Irze, "Two-Photon Photochromism of a Naphthopyran Derivative," J. Am. Chem. Soc. 115, 6442 (1993).

[5] R. C. Hoffman and R. S. Potember, "Organometallic Materials for Erasable Optical Storage," App7. Opt. 28, 1417 (1989).

[6] C. Y. Liu and A. J. Bard, "Optoelectronic Properties and Memories Based on Organic Single-Crystal Thin Films," Acc. Chem. Res. 32, 235 (1999).

[7] Z. Chen, A. Lewis, H. Takei, and I. Nebenzahl, "Bacteriorhodopsin Oriented in Polyvinyl Alcohol Films as an Erasable Optical Storage Medium," Appl. Opt. 30, 5188 (1991).

[8] S. Hvilsted, F. Andruzzi, and P. S. Ramaniujam, "Side-Chain Liquid-Crystalline Polyesters for Optical Information Storage," Opt. Lett. 17, 1234 (1992).

[9] F. Simoni, O. Francascangeli, Y. Reznikor, and S. Slussarenko, "Dye-Doped Liquid Crystals as High-Resolution Recording Media," Opt. Lett. 22, 549 (1997).

[10] C. Lenoble and R. S. Becken, "Photophysics, Photochemistry, Kinetrics, and Mechanisms of the Photochromism of 6'-Nitroindolinopiropyran," J. Phys. Chem. 90, 62 (1986).

[11] D. Day and M. Gu, "Effects of Refractive-Index Mismatch on Three-Dimensional Optical Data-Storage Density in a Two-Photon Bleaching Polymer," App. Opt. 37, 3299 (1998).

[12] G. Kampf and D. Mergel, "Information Storage Materials. Optical," in *Kirk-Othmer Encyclopedia of Chemical Technology*, Fourth Edition, Volume 14, p. 277, J. I. Kroschwitz and M. Howe-Grant, Editors, John Wiley and Sons. (1995).

DRAWINGS

FIG. 1 is a perspective view, partly schematic, of typical apparatus according to the present invention.

Each FIGS. 1A, 2–16 is described immediately below it.

FIGS. 17–19 are schematic views of another form of apparatus according to the invention.

CARRYING OUT THE INVENTION

Figure 1:
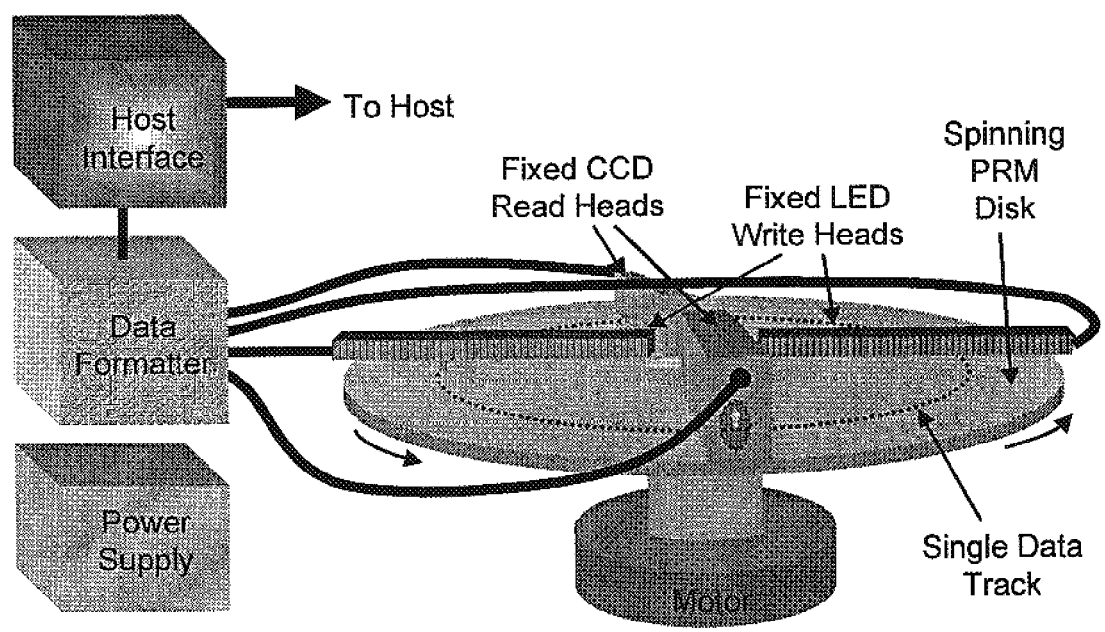
Figure 20:
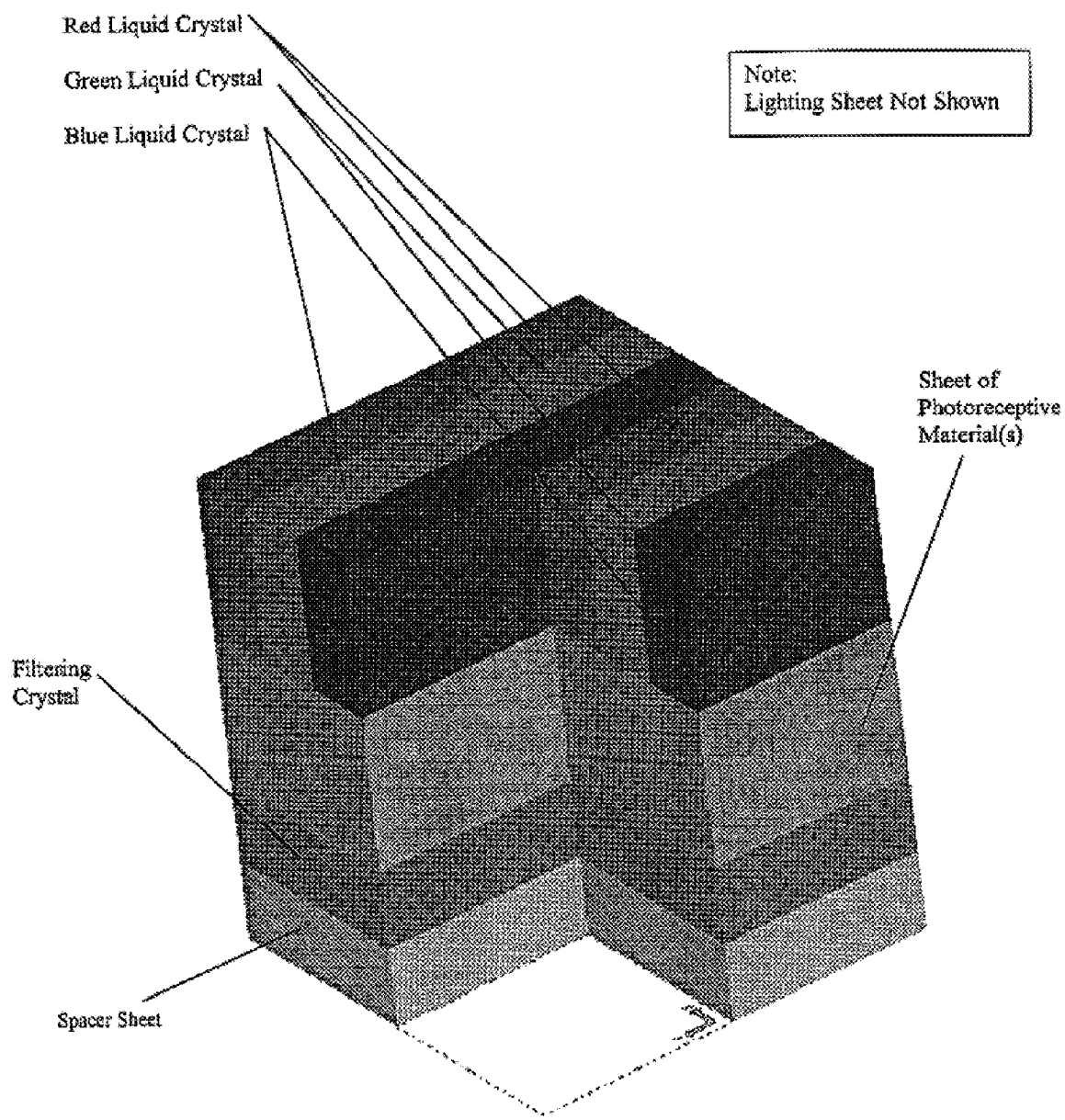
FIGS. 20 and 21 are perspective views of typical components of apparatus as in FIGS. 17–19.
Figure 21:
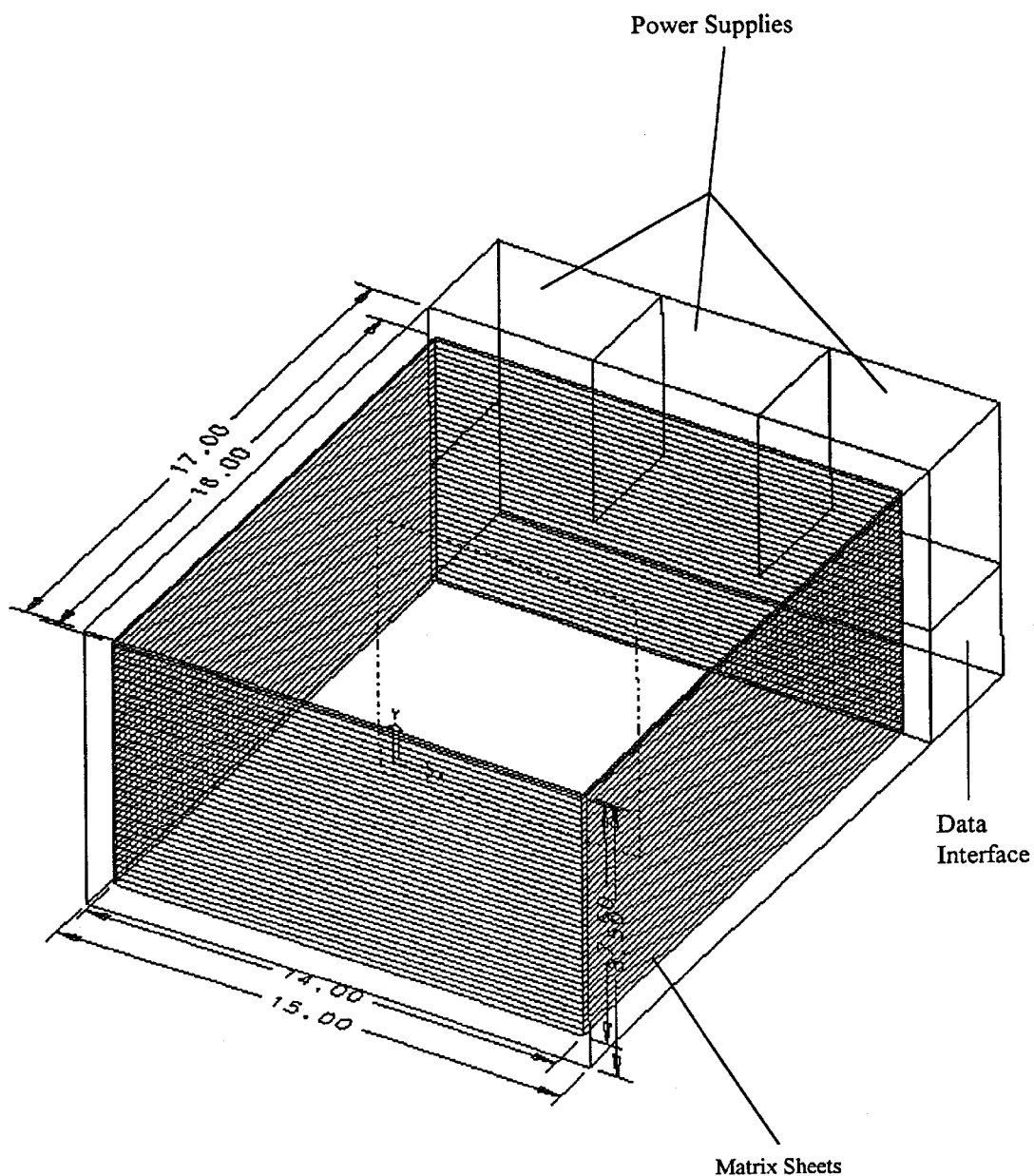
Figure 22:
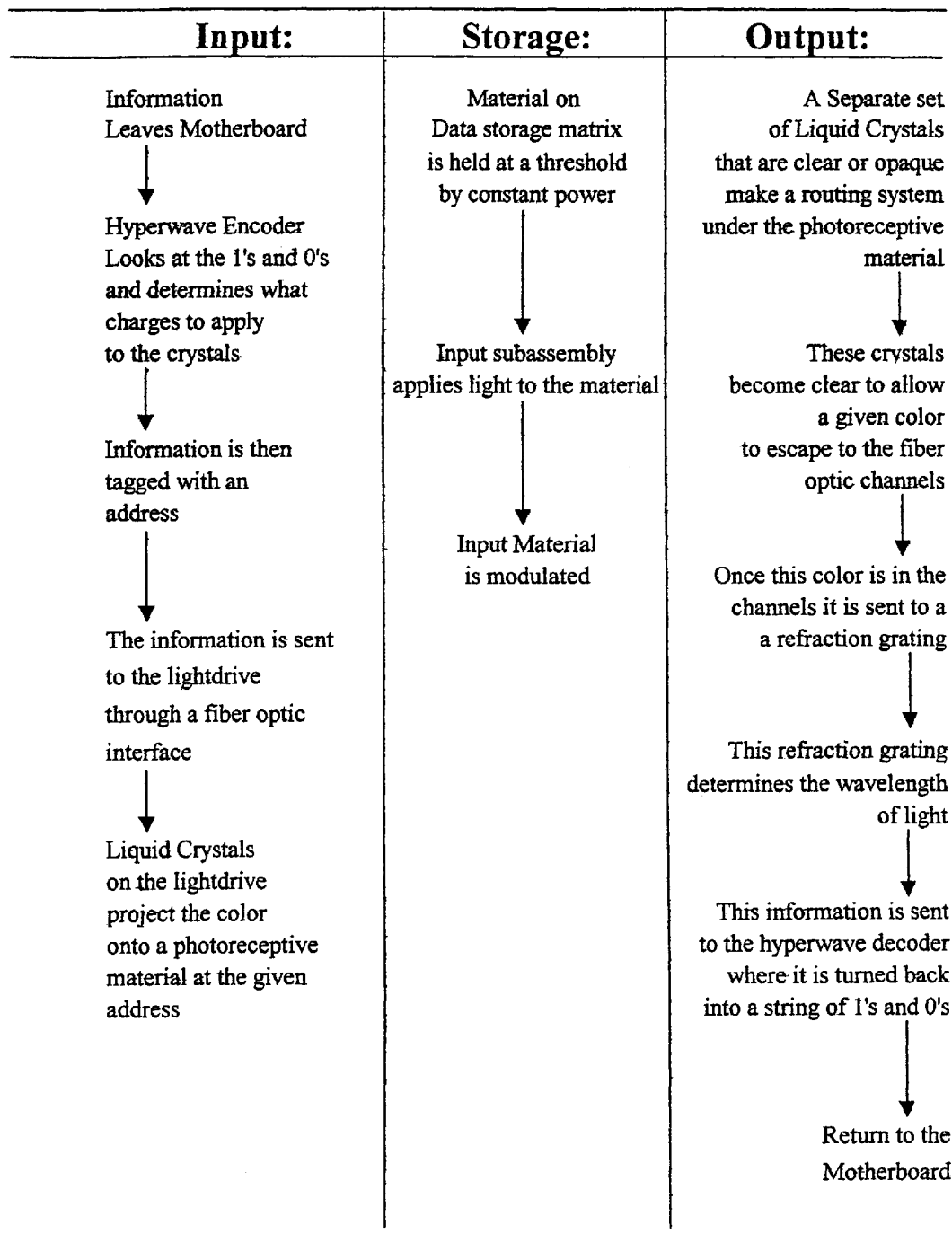
FIG. 22 is a flow chart for typical operation of apparatus according to the invention.

Acronyms and Abbreviations, in Order of First Use Herein

PRM photoreceptive material

LED light emitter diode

UPS uninterruptible power supply

FPGA field programmable gate array

ASIC application specific integrated circuit

SROM static read-only memory dpi dots per inch

OKI OKI Electric Industry and OKI Data

OLED organic LED

FED field emission display

LCD liquid crystal display

CCD charge coupled device

CIS contact image sensors

FAX facsimile

Analysis of Some Memory Concepts, November 1999, From Research and Studies by Scientists at Battelle Memorial Institute, Columbus, Ohio; Primarily by John J. Garvey Jr., Thomas M. Dolash, David J. Hermann, Van E. Wood, and Russell H. Barnes.

Use of the third dimension to increase storage density in optical memories is an idea with a long history, if few successes to date. In this section, we describe briefly a few of the concepts we have encountered in surveying recent literature, emphasizing multi-wavelength concepts. This is an active area of research and we may well have missed some relevant information. We discuss only ideas for general-purpose memories—that is, read, write, store, and erase. There are also numerous additional concepts for 3D-enhanced read-only memories, but we will not discuss them.

Any optical memory will obviously have to have significant advantages in capacity and/or speed if it is to displace conventional magnetic media. When optical memories were first seriously investigated in the 60's, it appeared that recording densities above $10^{12}$ bits/cm$^3$ might be possible, far beyond the capabilities then envisioned for magnetic memories. But 90-gigabyte hard disks for Hewlett-Packard workstations are available now, and if trends continue 750-gigabyte disk will be here in five years[1]. Access times are presently more a function of overall system architecture than of inherent limitations in the time to read a bit reliably, and for general-use computers will probably be bounded for some time in the future by limits on the CPU clock rate set by photolithography. Even clear speed and capacity advantages might not be sufficient to gain market entry for a new memory concept if it involves too much system redesign.

Nonetheless, the current wave of interest shows that the perceived market need is there. On the other hand, it also means that all sorts of ideas are being published and patented, making it more difficult to demonstrate significant novelty, to say nothing of significant advantage, for a particular idea.

The optical memories of the 60's were mainly holographic, and the three-dimensional memories were based on thick phase holograms, which are highly sensitive to angle, wavelength, and phase of the recording light beams, allowing for easy volume multiplexing. In these memories, pages of $10^4$ to $10^5$ bits are recorded and read at a time, greatly increasing data-transfer rates. The materials available in the 60's were expensive and not truly archival (and the page composers were unreasonably expensive as well, even given computer prices of those days), but the main reason these memories fell out of interest was that their great sensitivity to beam alignment meant that it was difficult to see how they could ever be used outside of a controlled laboratory situation. Recently, new recording materials and better understanding of the recording process have renewed interest in this type of memory[2]. In particular, organic holographic recording materials[3] show great promise and potential cost advantages. Moreover, advances in liquid crystals have made page composers less expensive. Still, many system design problems remain. The physical phenomenon—photorefractivity—used in almost all holographic memories may also find application in bit-by-bit memories, as we describe below.

The principal alternative to multilayers for increasing memory capacity is so-called near-field optics. Diffraction limitations of conventional optics can be circumvented by using tiny light sources[4] and/or recording through a tiny apertures[5]. Adapting such ideas to multilayer memories is almost a contradiction in terms, though not entirely so; more important at present is that materials being developed for such memories may also prove useful in multilayer devices. In particular, photochromic materials with fluorescent readout[5] are under development in Japan. The organic materials involved switch from open-ring to closed-ring form and back under illumination at two different wavelengths[6]. The materials show very good recyclability and thermal stability. A somewhat similar design, but using photochemical locking and unlocking of the molecule into its fluorescent form, is being pursued elsewhere[7].

Besides these organic photochromics, many inorganic photochromics that might be used are known. For example, a simple (some might say primitive) 5-layer photochromic bit-by-bit memory using the widely available crystal material $Bi_{12}SiO_{20}$ was demonstrated[8] by a group at Osaka University. Focusing an argon laser (wavelength 488 nm) at different depths led to darkening in the 500–700 nm spectral range due to unspecified impurities. Simple white-light readout was possible, and illumination in the red (633 nm) erased the spots, though it was not efficient. While the system was not practical, it showed the possibility of reading at different levels with change of focus alone, despite the interference from dots at other levels.

The need for large crystal samples of the photochromic material can probably be avoided by clever use of composites or several other methods. Polycrystalline or glassy photochromics that could form the basis of a memory are also possible, though. One such scheme, which received quite a bit of publicity several years ago[9,10], uses a sputtered thin film of a sulfide, such as strontium sulfide, doped with two rare earths, typically samarium and europium, both of which can exist in either divalent or trivalent states in the host material. A focused pulse of blue light transfers electrons from europium to samarium ions, where they are stably trapped. A red light causes a back transfer and leads to a luminescent orange flash from an excited state of the europium ion. The basic idea dates back to the 1960's. Its main problem is that readout is completely destructive; so every read pulse has to be followed immediately by a suitable rewrite pulse in the same spot. For multiplexing in a given location, the device developers (Optex Communications, Rockville Md.) showed that by changing the strength of the write pulse, a varying number of electrons in the accessed volume (a one micron cube) could be transferred to samarium ions. As many as 13 distinct writing levels in this volume could be detected. The company was listed in some business directories in 1998, but when we tried to get them, we found someone else had been given their number. A rather similar memory scheme was developed by a group in Japan[11].

In lieu of absorption changes, localized refractive-index changes have often been suggested as the basis of three-dimensional memories. Such changes are usually produced by the photorefractive effect, which occurs in many materials. When the sample is exposed to a spatially inhomogeneous beam (such as a strongly focused beam) of an appropriate wavelength, electrons are lifted to the conduction band and diffuse or drift in an electric field until they are retrapped in the unilluminated regions. Local electric fields set up by the inhomogeneous charge trapping lead to electrooptic distortions of the beam. The effect is most noticeable in polar materials where the trapping is asymmetric and the whole beam can be deflected. Distortions in one layer have little effect on out-of-focus read beams passing through to a deeper layer, clearly an advantage over color changes. For readout, a Nomarski or other type of phase-contrast microscope can be used. A model 3D memory using this concept was built by a group at Osaka University[12]. They used the quintessential photorefractive material, an iron-doped lithium niobate crystal. They could record and read out 6 distinct layers 15 $\mu$m apart, with 4 $\mu$m between adjacent recording spots. Long-term decay problems, without awkward and slow "fixing" procedures make lithium niobate unsuitable for general-purpose memories. As mentioned above, though, many new photorefractive materials are under development. Reversible photorefractive changes have been observed in some of the photochromic materials previously described[13].

The Osaka authors, and several others of those mentioned, have suggested two-photon absorption[14] as a method of recording efficiently in multilayers. In these devices, true simultaneous absorption of two separate photons, without any real intermediate state, is envisioned for writing, and often for reading, the data points. Generally, very high laser intensities are required to obtain the two-photon effects, although the total energy in each writing pulse may not need to be to be too large (perhaps in the millijoule range) if focusing and positioning are accurate. Most architectures are based on beams intersecting in the memory material at around a 90° angle. They do not necessarily have to be of the same wavelength, although often the absorption cross-section is higher if they are. Since the material absorption at the operating wavelengths can be very low except in the focus region, blocking by previously written spots and unwanted single-beam effects are not a problem, at least in principle. As a sample material, the California group[14] used a photochromic spirobenzopyran, which can be induced to open a closed ring, similarly to the diarylethenes mentioned above, when two photons are simultaneously absorbed. In the open-ring form, absorption of two infrared photons can induce a fluorescence, which can be used to read. The peak pulse intensities involved are in the range of 10's of gigawatts, and the material is not stable as a memory for more than a few minutes at room temperature, so this work must be seen as more of a laboratory curiosity and an attempt to stake out an IP position than anything else. Some attention to system architecture is given in their paper; a highly accurate variable-focus lens is needed, and they have devised a very clever scheme for making one holographically, though whether it would work for hundreds of memory planes I am not sure.

A large international group has been engaged for several years on a search for new molecules with larger two-photon-absorption cross-sections. They have had some success[15,16], but the huge improvements needed for use with small solid-state lasers still seem far away. There has also been continuing work at the University of California, Irvine, on the spiropyrans[17]. A Japanese group[18] described a photorefractive memory using two-photon absorption in undoped lithium niobate. Like their other demonstrations[8,12], it is a laboratory instrument with awkward computer-controlled 3D-scanning stages, but the results are impressive.

In the course of this study we came across several patents with features that might at least superficially be seen to resemble some of those that might be made by Lightwave Microsystems. These include U.S. Pat. No. 5,381,401[19] and other patents of the IBM San Jose group, which appear to make very general claims for the whole idea of multilayer memories. U.S. Pat. No. 5,838,653[20], assigned to Reveo, Inc., of Hawthorne N.Y., describes "an optical storage medium" with multilayers selected according to wavelength and polarization-state characteristics. U.S. Pat. No. 5,757,763[21], from a group at MIT, describes a multiple-layer, multiple-bit encoding scheme. U.S. Pat. No. 5,410,502[22], discussed briefly during the meeting of August 19, describes a multicolor method for multibit readout, though not necessarily in three dimensions. U.S. Pat. No. 4,090,031[23], from former Battelle Northwest researcher J. T. Russell, may be one of the first to describe a multilayer memory with color and/or photoluminescent selection. Russell has many patents over the past 30 years in this general area. We have not examined any of these in sufficient detail to know whether they cover the general-purpose memory situation effectively, or whether they are limited to read-only devices. While a more thorough search would be a good idea, the overall patent situation with regard to multilayer claims is at best perplexing. Our impression is that the situation in the two-photon absorption area is even worse.

References

[1] P. Wallich, "To Err Is Mechanical". Scientific American 281, #4, p. 50 (October 1999).

[2] L. Hesselink and M. C. Bashaw, "Optical memories implemented with photorefractive media". Optical and Quantum Electronics 25, S611–S661 (1993).

[3] Sandalphon, B. Kippelen, K. Meerholz, and N. Peyghambarian, "Ellipsometric measurements of poling birefringence, the Pockels effect, and the Kerr effect in high-performance photorefractive polymer composites". Applied Optics 35, 2346–4354 (1996).

[4] A. Partovi et al, "High-power laser light source for near-field optics and its application to high-density optical storage". Appl. Phys. Letters 75, 1515–1517 (1999).

[5] T. Tsujioka and M. Irie, "Theoretical study of signal-to-noise ratio on near-field photochromic memory with fluorescence readout". Applied Optics 38, 5066–5072 (1999).

[6] M. Irie, T. Lifka, and K. Uchida, "Photochromism of single crystalline diarylethenes". Molecular Crystals and Liquid Crystals A 297–298, 81–84 (1996).

[7] F. Pina et al, 'Photochromism of 4'-methoxyflavylium perchlorate. A "Write-Lock-Read-Unlock-Erase" molecular switching system. J. Amer. Chem. Soc. 119, 5556–5561 (1997).

[8] Y. Kawata, T. Tanaka, and S. Kawata, "Randomly accessible, multilayered optical memory with a $Bi_{12}SiO_{20}$ crystal". Applied Optics 35, 5308–5311 (1996).

[9] W. Wayt Gibbs, "Beyond Binary". Scientific American 275, #2, p. 31 (Aug. 1995).

[10] _, "Corporate Welfare"? Manufacturing Engineering 114, #5, p. 22 (Jun. 1995).

[11] H. Nanto et al, "Novel erasable and rewritable optical memory utilizing photostimulated luminescence in Eu and Sm codoped SrS phosphor ceramics". Japan. J. Appl. Phys., Part 136, 421–423 (1997).

[12] H. Ueki, Y. Kawata, and S. Kawata, "Three-dimensional optical bit-memory recording and reading with a photorefractive crystal: analysis and experiment". Applied Optics 35, 2457–2465 (1996).

[13] N. Tanio and M. Irie, "Photooptical switching of polymer film waveguide containing photochromic diarylethenes". Japan. J. Appl. Phys., Part 133, 1550–1553 (1994).

[14] S. Hunter et al, "Potentials of two-photon based 3-D optical memories for high performance computing". Applied Optics 29, 2058–2066 (1990).
[15] M. Albota et al, "Design of organic molecules with large two-photon absorption cross sections". Science 281, 1653–1656 (1998). [16] E. Wilson, "Two-photon punch for high-tech materials". Chem. and Engineering News 77, #10, pp. 10–11 (Mar. 8, 1999).
[17] A. Dvornikov, J. Malkin, and P. M. Rentzepis, "Spectroscopy and kinetics of photochromic materials for 3D optical memory device". J. Phys. Chem. 98, 6746–6752 (1994).
[18] Y. Kawata, H. Ishitobi, and S. Kawata, "Use of two-photon absorption in a photorefractive crystal for three-dimensional optical memory". Optics Letters 23, 756–758 (1998).
[19] M. Best, H. J. Rosen, K. A. Rubin, and T. C. Strand, U.S. Pat. No. 5,381,401, "Multiple data surface optical data storage systems". Issued Jan. 10, 1995.
[20] B. Fan and S. M. Faris, U.S. Pat. No. 5,838,653, "Multiple layer optical recording media and method and system for recording and reproducing information using the same". Issued Nov. 17, 1998.
[21] T. J. Green, Jr., S. Marcus, G. Swanson, and B. Colella, U.S. Pat. No. 5,757,763, "Optical information storage via amplitude modulation". Issued May 26, 1998.
[22] N. C. Bird, U.S. Pat. No. 5,410,502, "Opto-electronic memory systems". Issued Apr. 25, 1995.
[23] J. T. Russell, U.S. Pat. No. 4,090,031, "Multi-layered opitcal (sic) data records and playback apparatus". Issued May 16, 1978.

Organic Materials for Light Drive Applications

This section reviews the status of organic and polymeric materials for optical memories and optical switches as applied to the light drive concept. A great deal of research, as evidenced by the voluminous scientific and technical literature, is being pursued with the ultimate goal of developing practical organic materials for future generation high-density optical digital memories. Currently, there are no commercially viable photochemical organic-based memory systems available, and it appears that extensive research and development will be needed to bring such devices to fruition. However, the current and recent research shows promising progress, and there is expectation that photochemical organic memories will be developed.

The concept for the light drive memory involves a mechanically driven disc with a five-layer coating of photoreceptive materials that store data in pixels by retaining the color of light and relative light levels. Each layer in a pixel is to represent a separate color that can be individually addressed to store 20 bits per pixel. Specified pixel size is down to 6.5-$\mu$m square with recording speeds up to 120 MHz. The memory should be nonvolatile, erasable, and completely addressable optically. Write and erase functions are to be based on excitation of specific optical wavelengths for each pixel layer with emitted fluorescence used for readout. The focus of this review is limited to those mechanisms and organic materials that have possible potential for meeting these requirements, or illustrate processes that may eventually lead to successful devices. Some of the quoted references can be useful for identifying researchers and organizations playing a leading role in the development of these types of materials of interest.

The literature review was directed to the following materials and mechanisms as they apply to optical memories, optical switches, photochemistry, and optical bistability based on organic materials:

Charge transfer
Energy transfer
Dissociation
Polyacetylenes
Fullerenes
Organometallic compounds
Photoisomerization
Intercalation compounds
Photochromism
Liquid crystals.

Results from the literature search are summarized in the next section of this report. This is followed by a conclusions section containing recommendations for persons and organizations that are on the forefront of organic optical memories and may be the source of major future breakthroughs.

Materials for Organic Optical Memories

Summarized in this section is information on classes of organic compounds that have been under investigation either to gain insight into the mechanisms or processes in molecules that are involved in optical switching, or as possible candidate materials. Some of the studies involve molecules in solvents and have not progressed to the point of incorporating them into solid matrices or films that would be necessary for practical memory devices.

Organic molecules are of interest for memories because there is the potential to control their structures and properties in a systematic way[1], and it is well known that there are photochromic organic molecules that can be changed from one color to another by irradiation with light. A simple mechanism for optical switching in a structured organic molecular system is illustrated in FIG. 1A. This structure is represented by a donor moiety connected by a conjugated organic bridge to an acceptor moiety on the other end of the molecular system. Light absorbed by the donor can transfer energy or an electron over the bridge to the acceptor to change its property or emit fluorescence. By using light to switch the bridge on or off, the molecule can be used to store a digital bit. A limiting factor in designing the molecular structure of the bridge is a lack of detailed understanding of the intramolecular interactions that control charge transport processes[2]. It is known, though, that planar bridges with extended $\pi$-conjugation are importation features[3]. Changing the conformation of the bridge from planar to nonplanar is one mechanism for switching[4]. Types of organic molecules considered as switch candidates include polyporphyrins, polypherylenes, and polythiophenes. Further details on studies of molecular optical switches are presented below.

Fulgides

Fulgides may exhibit a diastereoselective photochromism that induces changes in chiroptical properties useful for optical switching. This has been in the case of an indolyl-fulgides with a binaphthol moiety as a chiral auxiliary[5]. Introduction of an optically active auxiliary to an achiral photochromic compound produces an enantiomer, which shows a photochromic interconversion between the two enantiomers. Tests with the fulgides in poly (methylmethacrylate) showed photoreversible switching at wavelengths of 366 and >470 nm; however, the response was slow, a matter of minutes. An increase in irradiation intensity will decrease response time.

Another fulgide structure involving an anthryl donor and an amino-coumarin carboxylic acid ethyl ester as an acceptor showed reversible optical switching[6]. The ring opening-ring closing photoreaction in the fulgide structure was used as a gate to control energy transport along the fulgide bridge. This is illustrated in FIG. 2. The closed ring structure in the fulgide acts as a trap for energy flow preventing excitation of fluorescence from the acceptor. Fluorescence from the acceptor is an indicator of energy transfer along the bridge. FIG. 3 shows the fluorescence response during one switching cycle. The switch is turned on under irradiation at 520 nm and turns off by irradiation at 320 nm.

Another example of a fulgide switch with a porphyrin-type acceptor is shown in FIG. 4.

Polythiophenes

A number of polythiophene structures have shown optical switching capabilities. One example is shown in FIG. 5. In this case, closing of a ring converts a fluorescent structure to a nonfluorescent one with reversibility of the process. Another scheme is presented in FIG. 6. Here, an electrochemical reduction-oxidation (redox) reaction is used to lock or unlock the memory for enhanced stability. This is a hybrid process, but conceivably the lock-unlock process may be activated optically, with certain molecular structures.

The structure presented in FIG. 7 can be reversibly switched from the open to the closed form with significant changes in spectroscopic properties. Absorption spectra for the two forms in methanol solution are given in FIG. 8. Fluorescence spectra for the two forms are shown in FIG. 9.

Femtosecond dynamics of switching of a thiophene oligomer with diarylethene structures of the open and closed forms of the compound are given FIG. 10. The absorption spectra for the two forms are shown in FIG. 11. The closed form as measured by transient absorption spectroscopy was switched with a time constant of about 1.1 picoseconds.

Optical switching was also observed in sexithrophenes[9]. The structures of the two forms and their interconversion wavelengths are given in FIG. 10. Absorption spectra for the two forms in cyclohexane solution are presented in FIG. 11.

Liquid Crystals

Some work has been performed on switchable liquid crystals containing chromophoric azobenzene moieties[10, 11]. The photochemical reaction involves a reversible trans-cis isomerization. Calamitic liquid crystalline materials are considered to have some potential for digital storage.

Porphyrins

Optoelectronic switches based on porphyrin structures have been investigated[12]. Two schemes involving a combination of optical excitation and chemical redox are diagrammed in FIG. 12. Energy transfers with switching are depicted in FIG. 13. The need for the chemical redox process is undesirable for the present application. However, moieties that can be switched optically could be of interest.

Chiroptical Materials

A highly stereoselective switch scheme is shown in FIG. 14. It was observed that the P-4 (cis) and M-5 (trans) compounds are fluorescent with distinct differences in the fluorescence intensities of the isomeric alkenes.

Photodimerization

An example of photodimerization is shown in FIG. 15[14, 15]. This figure shows the [2+2] cycloaddition of appended commarin as a self-assembled monolayer on a gold surface. The dimer is nonfluorescent while the monomer is fluorescent. The commarin fluorescence can be extinguished by irradiation at 350 nm, and restored by irradiation at 254 nm. Another example of photodimerization is given in FIG. 16.

In this case dimerization occurs photochemically with the reverse switching requiring heat which could be applied optically, but would not be desirable for the intended application of interest. Self-assembled monofilms of this material were found to have poor stability under irradiation.

Conclusions

A variety of mechanisms and materials are available that are capable of optical switching. However, this technology is not developed to the point where practical memory devices can be fabricated. Even when viable materials have been developed, it will still require a significant effort to develop the manufacturing procedures to incorporate the materials into practical high-density digital memory devices. As a recommendation, it appears that the significant developments needed to take the organic photochemical memory technology forward could occur at the University of Texas at Austin. Some of their recent work is covered in References 14 and 15 of this review. Future work at the University of Groningen in the Netherlands (Reference 13) may also be of interest. These organizations have been working on photoreversible molecules in solid films in substrates, which is important for device development.

References

[1] M. H. Pilkuhn, "Molecular Electronics: New Prospects for Information Technology," Proc. Intern. Conf. Inteyr. Circuit Technol., 4$^{th}$, G. L. Baldwin (Editor) Institute of Electrical Electronics Engineers, New York, N.Y. (1995).

[2] J. R. Sheats and P. F. Barbara, "Molecular Materials in Electronic and Optoelectronic Devices," Acc. Chem. Res. 32, 191 (1999).

[3] M. A. Reed, "Molecular-Scale Electronics," Proc. IEEE 87 652 (1999).

[4] M. D. Ward, "Current Developments in Molecular Switches," Chem. Ind. 640 (1997).

[5] Y. Yokoyama, S. Uchida, Y. Yokoyama, Y. Sugaware and Y. Kurita, "Diastereoselective Photochromism of a (R)-Binaphthol-Condensed Indolylfulgide," J. Am. Chem. Soc. 118, 3100 (1996).

[6] J. Walz, K. Ulrich, H. Port, H. C. Wolf, J. Wonner, and F. Effenberger, "Fulgide as Switches for Intermolecular Energy Transfer," Chem. Phys. Lett. 213, 321 (1993).

[7] G. M. Tsivgoulis and J.-M. Lehn, "Photoswitched and Functionalized Oligothiophenes: Synthesis and Photochemical and Electrochemical Properties," Chem. Eur. J. 2, 1399 (1996).

[8] N. Tamai, T. Saika, T. Shimidzu, and M. Irie, "Femtosecond Dynamics of a Thiophene Oligomer with a Photoswitch by Transient Absorption Spectroscopy," J. Phys. Chem. 100, 4689 (1996).

[9] M. Tsivgoulis and J.-M. Lehn, "Photoswitched Sexithiophenes: Towards Switchable Molecular Wires," Adv. Mater. 9, 39 (1997).

[10] A. Stracke, J. H. Wandorff, D. Janietz, and S. Mahlstedt, "Functionalized Liquid-Crystalline Donor-Acceptor Triple Compounds Containing Azobenzene for Optical Storage," Adv. Mater. 11, 667 (1999).

[11] M. Hasegawa, T. Yamamoto, A. Kanazawa, T. Shiono, and T. Ikeda, "A Dynamic Grating Using a Photochemical Phase Transition of Polymer Liquid Crystals Containing Azobenzene Derivatives," Adv. Mater. 11, 675 (1999).

[12] R. W. Wagner, J. S. Lindsey, J. Seth, V. Palaniappan, and D. F. Bocian, "Molecular Optoelectronic Gates," J. Am. Chem. Soc. 118, 3996 (1996).

[13] B. L. Feringa, N. P. M. Huck, and A. M. Schoevaars, "Chiroptical Molecular Switches," Adv. Mater. 8, 681 (1996).

[14] M. A. Fox, "Fundamentals in the Design of Molecular Electronic Devices: Long-Range Charge Carrier Transport and Electronic Coupling," Acc. Chem. Res. 32, 201 (1999).

[15] W. Li, V. Lynch, H. Thompson and M. A. Fox, "Self-Assembled Monolayers of 7-(10-Thiodecoxy) Courmarin on Gold: Synthesis, Characterization, and Photodimenization," J. Am. Chem. Soc. 119, 7211 (1997).

Glossary of Special Terms

Chiral—Molecules not superimposable with their mirror images.
Conformation—Specific orientation of atoms in a molecular structure.
Conjugation—A molecular hydrocarbon structure with two or more double bond between carbon atoms separated by single bond.
Diastereoisomer—Pair of optical isomers which are not mirror images of each other.
Enantiomer—Isomeric pair with nonsuperimposable mirror images.
Isomer—One or more compounds with the same chemical formula.
Monomer—A simple molecule capable of combining with a number of like or different molecules to form a polymer.
Oligomer—A polymer made up of two, three, or four monomer units.
Photochromism—The ability of a molecular species to change color when exposed to light.
Polymer—Substance made of giant molecules formed by the union of small molecules (monomers)
Stereoisomer—Molecule with the same number and kinds of atoms but with different arrangements.

Engineering Challenges

Needing to be addressed are the following engineering challenges to constructing a light drive with current technology.

Identification of the most effective photoreceptive material should be pursued first.

The alignment required for 2400 dpi could be difficult. The dual LED array write heads go probably should be aligned to within microns. This is much tighter alignment than is usually provided between the location of the LED emitters and the package pins or mounting provisions. The alignment of the CCD read heads also probably should be maintained to within microns. Custom-developed components may greatly improve the alignment problem, but these components might be applicable only to the light drive, which may increase costs.

Achieving five different colors in the light drive may be difficult. Probably the system will be able to differentiate four different colors with less difficulty. Currently, LED arrays are only available in red. The fabrication process used to create high density (1200 dpi) LED arrays may not be easily adaptable to multiple colors. There are currently no known processes for fabricating high-density LED arrays using the common materials that produce the other colors. OLED technology may provide high density OLED arrays in multiple colors, but this is not known at present.

Maintaining sixteen distinct levels (four bits) per color may be difficult. After factoring in noise and non-uniformities through the write head, PRM, and read head, only one or two bits may be recoverable error-free. This may be improved, however, in future generations of the light drive using custom-developed components. With eight or more bits of uniformity correction in both the write and read heads, it may be possible to achieve 6 to 8 bits per cell.

The track read/write speed of the Light Drive is rather slow with current off-the-shelf CCD technology. The slow read speed may limit the disk rotation speed of the postulated system to about 36 RPM. The massively parallel read/write system provides sufficient bandwidth (about 0.5 Gigabytes per second) at this speed when all tracks are accessed at once. The low rotation speed may introduce data latency problems that could require large cache memory. Faster light sensor arrays may be needed to solve this problem. High speed CCDs are available for niche applications. At present they are expensive. A custom-developed CCD linear array with a large number of readout taps could provide the desired read speed within a few years.

The data density of the light drive using current technology is limited to about 0.11 Gbits/in$^2$. Current magnetic disk technology is capable of about 200 times this density. Also, the data density of magnetic storage continues to increase with new recording techniques. The light drive might not achieve data densities as high as magnetic storage.

We have here presented the light drive concept and a postulated system based on currently available technology. The four subsystems of the light drive have been defined, along with the subsystem requirements and enabling technologies. From this analysis, several observations can be made. The light drive has some unique advantages over conventional magnetic disk storage. It also has some limitations. One clear advantage of the light drive is a direct result of the massively parallel read/write system: the light drive offers extremely high peak throughput. Other advantages include inherent immunity to magnetic fields and promising growth potential. However, the light drive might not provide the data density of magnetic storage, and may require considerably more power than magnetic disks. Finally, the light drive may have a high to very high cost, due to the complex electronics and exotic read/write heads. Future technology developments, both in materials (PRM) and components (light emitters, optical sensors) may enable the light drive to overcome current engineering challenges and possible design disadvantages to become a serious competitor to existing data storage technologies.

Earlier Embodiment of the Light Drive (Only Secondarily Preferred at Present, Because it May be Unduly Expensive Using Components that are now Readily Available)

An Analysis of the Theory of the Light-Drive

For years the electromagnetic medium has been the mainstay of data storage. This technology has been around for over a decade and as in other areas it is time for a change. The vacuum tube was replaced by the hard disk drive and now the time has come to replace the hard disk drive with the light-drive. The light-drive is a radically new idea that may be able to transcend the limits of conventional data storage and could revolutionize the way we think of data storage capacity. Instead of measuring a hard drive's capacity in megabytes or gigabytes, now we will have the first drive capable of holding a terabyte of information and possibly more, with little or no access time.

Electromagnetic hard drives may be approaching the end of their usefulness The time has come for a revolution in the development of new storage technologies. The answer to this quest could be the light-drive. This device would work completely on technology commonly in use in other areas of the computer industry; however, it would be a major advancement over today's data storage devices. This section details step by step just how this light-drive works, as well as the resource information used to develop it.

The principles behind the light-drive are simple. It stores memory by flashing a particular color of light on to a photoreceptive material. The data is encoded in the wavelength of light. This wavelength of light is then read and decoded to return the data to binary form. This represents a major advancement over conventional hard drives. The conventional hard drive has a spinning platter on which an electromagnetic signature is written by a read/write head. Later when this information is requested, this read/write head searches the disk for the signature. The light-drive has a fundamental advantage since the information is written directly onto a matrix, therefore making seek time (time spent searching for information) negligible. This matrix concept makes the light-drive more similar to an SSD Drive than an electromagnetic hard drive, but less expensive and with a larger capacity than both. An SSD Drive is a Solid State Disk Drive. This is an ultra expensive storage method (about $5 per megabyte compared to $0.10 per megabyte with a conventional hard drive). The expense of this hard drive is made up in its speed. It has a seek time of around 0.35 milliseconds (30 times faster than a hard drive, but not faster than a light-drive). This technology is employed mostly by power hungry corporations and the U.S. Government. Also it is important to note that to build an SSD Drive to match the Light-drive would cost around $5 Million Dollars.

Referring now to FIGS. 17–21, the structure of the system is fairly conventional. The case typically consists of a data chamber to house the matrices and LCD Panels, and located beside these a UPS, or Uninterruptible Power Supply. Since the technology behind the light-drive requires a constant steady flow of power, this UPS is important. On the surface this may seem like a weakness; however this technology will mostly be employed in high-end servers, which are almost never shut off. In order to keep the static charge, which holds the matrix together, power could be supplied by the UPS for at least a month. While conventional hard drives merely forget the address of deleted data, the light-drive securely deletes the data by nullifying the wavelength. Also present are an LED panel and a power interface. The LED Panel is used as an update screen to show that all the systems are functioning properly, and to provide an early warning of any problems. This device is compliant with the SMART (Self-Monitoring, Analysis and Reporting Technology) standard. The power interface is where the computer's power supply inputs power directly to the UPS where it is processed and used.

FIG. 17 includes four items, all of them located on the wave encoder card. In item 1 the data are coming off the bus and onto the card. The individual arrows show the data entering the separate traces. Item 2 is a processing unit that converts the data into instructions for the liquid crystals and assigns an address to the packet. This system of addressing can work in a similar manner to the way Ethernet works, where each packet of data is tagged with an IP (Internet Protocol) address. In this case the IP address is the address of the cluster to which it was to be written. Item 3 is an SRAM cache, which allows for a timing difference between the actual write speed of the drive and the decode speed of the processor. It might not be needed, but this is where it would be if it is needed. Item 4 is a Digital Fiber optic interface through which the information is sent out on the fiber optic cable that connects the wave card and the light-drive.

FIG. 18 comprises items on the light-drive itself. Item 5 is another Digital Fiber interface that receives signals from the wave encoder card. Item 6 is a director chip. It reads the digital feed, separates the address from the data and sends the instructions to the liquid crystals at the proper address. Item 7 is the three individual liquid crystals that work in concert to create the given wavelength that represents the stream of 1's and 0's. Item 8 is the photoreceptive material (PRM) that accepts the wavelength and stores it.

In FIG. 19 the items are both on the light drive and on the wave decoder card. Item 9 is the given cluster of photoreceptive material. Item 10 is a filtering crystal. When the given wavelength is called this crystal becomes clear and allows the wavelength to escape. It is then channeled to an analog fiber interface (not shown) to the wave decoder card. The analog interface terminates into a refraction grating, (item 11). Behind this there is a receptor plate that detects where the maxima and minima are. This information is sent to item 12, the decoder chip, which converts it into the stream of 1's and 0's it was meant to represent. This is then dumped out onto the bus 13 where it can be used by the computer.

Wave Encoder/Decoder {Input}

Standard Interfacing systems for today's hard drives such as the Small Computer System Interface or SCSI have maximum transfer rates of around 40 Megabytes per Second. Due to the incredible potential of the light-drive it would be foolish to limit its speed with an existing interface so one is custom built for it. This Hyper-wave card typically is a cross between a video accelerator card and a modem. Instead of sending video information to a monitor it sends the same type of information to the LCD panels in the light-drive. Given that today's high-end video cards are capable of resolutions of 1,600 by 1,280 pixels at 85 Hz with a pixel depth of 32 bits, this can provide a tremendous amount of data to the light drive. (See Calculations Below)

| | |
|---|---|
| 1,600 × 1,280 = 2,048,000 | [Total Number of Pixels] |
| 2,048,000 × 85 = 174,080,000 | [Total Pixels Displayed in one second] |
| 174,080,000 × 32 = 5,570,560,000 | [Total Number of Bits per second] |
| 5,570,560,000/8 = 696,320,000 | [Total Number of Bytes per second] |

As one can see, this technology can easily transmit 696 megabytes of data in one second, which is well over 17 times the bandwidth of today's fastest SCSI-3 hard drives. It also performs CRC (Cyclical Redundancy Checking), a technology performed by all of today's higher end data storage units. The hyper-wave encoder reads the information off the grid and compares it to the information in its buffer. If the information matches, then the encoder proceeds; however, if they do not, then it recalibrates the charges for the LCD's and tries again. If a given number of attempts fail, the sector is marked as dead and is no longer used by the system. This is somewhat similar to the technology employed by today's hard drives.

The Flat Storage Matrix System

The Light Drive uses a type of flat matrix to store data. The total surface area of the ire matrix is 8064 cm$^2$, however to allow for extra spacing the surface was calculated as 8000 cm$^2$. Chambers are cut in the surface by laser beams. Each of these chambers holds a phosphor packet. The sidewalls of the chamber are fused to the outside edges of the set of liquid crystals assigned to the packet. Behind this surface are power points one of which runs to each phosphor packet. The phosphors lose their energy at the same rate, so each power point supplies the phosphors with that identical amount of power thus keeping their wavelength constant. Next to the power points lay the repeating stations. These stations are the read heads of the hard drive. They take a sample of the phosphors wavelength and simultaneously compare it to a known wavelength. Each phosphor has a frequency between $10^{14}$ Hz and $10^{16}$ Hz that represents one possible permutation of 32 bits. This makes the processor's job simple, as all it has to do is measure the distance between maxima in the spectrum produced by the light as it passes through the diffraction grating. A space is left in the bandwidth to allow for transients and phase shifts in the wavelength to prevent corruption of data. (See also "Fail-safes and Redundancies").

The phosphor packets (or clusters) typically have a surface area around 3.201 $\mu m^2$. This was derived from the following series of equations:

$$8 \times 10^{12}/8000 = 1 \times 10^9$$

(Number of bits in a terabyte divided by the number of square centimeters on the matrix)

$$1 \times 10^9/32 = 3.125 \times 10^7$$

(Data in a cell divided by amount of data per phosphor yields required number of phosphors)

$$\sqrt{31250000} = 5{,}590.169944$$

(The square root of number of packets per $cm^2$ yields number of phosphors per cm)

$$5{,}590.169944^{-1} = 1.788854382 \times 10^{-4} \text{ cm}$$

(The inverse of phosphors per centimeter yields centimeters per phosphors)

$$(1.788854382 \times 10^{-4})(1 \times 10^4) = 1.788854382 \ \mu m$$

(Centimeters per phosphor converted to micrometers)

$$(1.788854382 \ \mu m)^2 = 3.2 \ \mu m^2$$

The way the matrix works is simple. Each phosphor (or other photoreceptive material) is assigned three liquid crystals. These three crystals can create any wavelength in the visible light spectrum. The liquid crystals light up in differing strengths to impart different colors onto their respective phosphors. This is similar to the technology used in the cathode ray tubes of monitors today. This wavelength represents the stream of ones and zeros that is the data, which is held constant on the matrix by using standard DC power. Because the matrix is composed of all the same material, all the phosphors lose their charge at the same rate. Therefore, the matrix can easily be charged with the exact amount of power that the phosphors are losing thus holding their wavelength constant. This is the reason the UPS system is added to the light-drive. This device typically is used on servers and mainframes that never shut down, so it is merely a fail-safe. Since the energy required to hold the charge is negligible, the demands on the UPS, if called into play, are minimal. Information can be deleted from this matrix as easily as it can be written. Imbedded in each packet are micro-switches that can shut the power off to the phosphor; by doing this the memory in that packet is deleted. The micro-switches are interconnected so that a single phosphor can easily be shut down without affecting the surrounding packets of data. This is an advancement beyond magnetic media, because the light-drive can write and delete information simultaneously. This advancement will be of great importance to mainframe users since information often has to be replaced with updated data. Also this is an advancement in security, because it is possible for anyone to resurrect deleted data from a conventional hard drive. Once information is deleted from the light-drive, however, it is gone.

Data sorting on the matrix typically follows the standard guidelines of a regular hard drive. Each bit of data has an address, which is stored on the disk map. This data map has all of the standard redundancies of an electromagnetic hard drive. Partitions work similarly since they are based in software, and not hardware. Data storage in this aspect is identical to that of a conventional hard drive. The light-drive also supports FAT, FAT32, HPFS and NTFS file allocation methods. (FAT stands for File Allocation Table and is the standard by which most computers run. FAT32 is a new allocation method that reduces the minimum cluster size for partitions. This technology is merely an advancement of the FAT system. HPFS stands for High Performance File System and is a special allocation method designed by IBM to run on their OS/2 operating system. NTFS stands for New Technology File System and is a special allocation method designed by Microsoft to run on their Windows NT operating system.

Wave Encoder/Decoder {Output}

The output chips work in a similar fashion to the input chips. Together they act as a bridge between the light-drive and the rest of the computer. Just as in a conventional hard drive, the computer calls for the address and the request is sent to the output chips. The output chips send the message to the processing station that calculates the information for that phosphor. The light, which is channeled from the drive by way of fiber optics, is sent to the output card. The output card has a diffraction grating, which consists of a thin sheet of crystal and a sensor plate. The light passes through the thin crystal, which has a tightly packed lattice structure. Once it passes through the grating it diffracts differently for each wavelength. The sensor plate just reads where the bright bands are and determines the wavelength from that using the formula $d(\sin\theta) = mm\lambda$ where d is the lattice separation, $\theta$ is the angle between the normal vector of the grate and the bright band, m is the number of the maxima away from the central maximum, and $\lambda$ is the wavelength.

Fail-Safes and Redundancies

No device is without small transients and other glitches that can affect its performance and the light-drive is no exception. For this reason the light drive typically has several backups to the main systems of the hard drive to allow for smooth continuous operation. The first exists in the input chips on the hyper-wave card, which has a cache buffer of ECC SDRAM. As stated above this RAM has the ability to correct errors in its processing.

Next is the CRC which takes the information that is placed on the matrix and compares it to the information stored in the input cache. If they are not the same, the input cache will recalibrate itself and try again.

Another fail-safe is in the processing station. A diffraction grating is employed to allow swift calculations of the wavelengths. When the light passes through the diffraction grating it creates several bright bands. Each of these bands can give the wavelength, but all of them will be taken into account in the calculations to ensure accuracy.

The final fail-safe is in the UPS. It is designed to be a triple redundant system consisting of three "hot-swappable" cubes with each capable of running the hard drive alone. If one of them were to fail, a warning message would appear on the front LED panel of the hard drive. However if the second were to fail, leaving only one power supplyin operation, the hard drive would be programmed to send an audible message to the PC speaker to warn the system administrator of impending danger. This is also incorporated into the SMART compliance that was mentioned above.

The drive typically is laid out in sheets. There is the lighting sheet on top, followed by the sheet with the liquid crystals, then the various sheet(s) of photoreceptive material (s), the filtering crystal sheet, and finally the spacer sheet to allow the light to escape (See FIG. 20). This pattern can be repeated for each level of the drive, typically with multiple sheets of photoreceptive materials, because it may prove fruitful to allow for phosphor stacking to achieve purity of color. Due to the repetitive nature of the drive, the construction lends itself to automation.

The cards can be cheaply constructed as well. They are simply built like any graphics card. The only catch with this construction is that on the encoder/decoder (or just the decoder if they are separate cards) there is a refraction grating employing a crystal with a tightly packed lattice structure. The tight packing allows the subtlest differences in wavelengths to be very pronounced in distances on the receptor grid. Doing this allows the use of wavelengths that are close to each other, thus increasing the density of data storage capability.

The world is filled with power hungry computer users and the demand for data storage increases with each passing day. Conventional media cannot keep up, so it is time to move on to the next level. The light-drive is largely the use of conventional technology in an unconventional fashion.

This technology is well ahead of its time. Only a few intrepid scientists have even mentioned the possibility of using chemicals in computing. Professor John Ross of Stanford University was quoted in *Popular Science* magazine as saying that scientists should explore the possibility of using chemicals and optics in computing (*Popular Science*, August 1995, Page 34). When the main inventor (JMJ) read the article he had been working on his original light-drive plans for about three months.

It is said that two qualities mark a true advancement. The first is that it must be superior in every fashion to that which it supersedes, and the light-drive will be far superior to its electromagnetic counterpart. The second is that it must be compatible. Many a new technology has been superior to its competitors but was never used because it simply did not conform. This technology will adapt into any computer in use today and run exactly like a conventional hard drive. The 1940's featured scientists trying to break the sound barrier, and today we will try to break the data storage barriers. IBM's GMR (Giant Magnetic Resonance) technology has dramatically increased the density of data packing onto a hard disk; however, this is only a stopgap to extend the life of the hard disk drive. Just as in the middle of this century jet engines replaced propellers, now it is time to replace magnetic media with light-encoded media.

While the forms of the invention disclosed herein constitute currently preferred embodiments, many others are possible. It is not intended herein to mention all of the possible equivalent forms or ramifications of the invention. It is to be understood that the terms used are merely descriptive rather than limiting, and that various changes may be made without departing from the spirit or scope of the invention.

We claim:

1. Apparatus for storage of digital data, comprising a host interface for receiving digital data interface input from a host computer and delivering digital data interface output to the host computer, the interface output data comprising a function of the interface input data;

an optical storage device for receiving the interface output data from the host interface and providing optical radiation, of wavelength in the range at least of about ultraviolet to at least about infrared to each of a series of pixels in a region of a member comprising an effective concentration of photoreceptive material and wherein the wavelength and intensity of the radiation in each pixel are functions of the interface output data received from the host interface; and a transmission medium for providing a datum signal from each pixel via the host interface to the host computer.

2. Apparatus as in claim 1, wherein the pixels are arranged at least predominantly in concentric rings on an at least approximately flat major surface of the member comprising the photoreceptive material.

3. Apparatus as in claim 2, comprising:
   a. a driving motor for rotating the member having the surface comprising photoreceptive material at least approximately in the plane of that surface;
   b. a data formatter for communicating the data between the host interface and the optical storage device as optical radiation;
   c. a power supply system that is able to provide the electrical power needed by the apparatus substantially without interruption;
   d. write heads communicating from the data formatter to the major surface of the photoreceptive material, each write head comprising a light emitting diode; and
   e. read heads communicating from the major surface of the photoreceptive material to the data formatter each read head comprising a charge-coupled device or a light emitting diode.

4. Apparatus as in claim 1, wherein the photoreceptive material is selected from the group of organic photoreceptive materials consisting of:
   a. charge transfer, energy transfer, dissociation, polyacetylenes, fullerenes, organometallic compounds, photoisomerization, polythiophenes, intercalation compounds, polarization, photochromism, and liquid crystals;
   b. photochromic organic molecules that can be changed from one color to another by irradiation with light, having a donor moiety connected by a conjugated organic bridge to an acceptor moiety on the other end of the molecular system, so that light absorbed by the donor can transfer energy or an electron over the bridge to the acceptor to change its property or emit fluorescence, and wherein by using light to switch the bridge on or off, the molecule can store a digital bit;
   c. planar bridges with extended $\pi$-conjugation wherein a bridge is switched by changing the conformation of the bridge from planar to nonplanar;
   d. polyporphyrins, polyphenylenes, or polythiophenes;
   e. fulgides having a diastereoselective photochromism that induces changes in chiroptical properties useful for optical switching, whereby introduction of an optically active auxiliary to an achiral photochromic compound produces an enantiomer, which shows a photochromic interconversion between the two enantiomers;
   f. a fulgide structure having an anthryl donor and an amino-coumarin carboxylic acid ethyl ester as an acceptor, for reversible optical switching, wherein the ring opening-ring closing photoreaction in the fulgide structure acts like a gate to control energy transport along the fulgide bridge, the closed ring structure in the fulgide acting as a trap for energy flow preventing excitation of fluorescence from the acceptor; and
   g. polythiophene structures wherein closing of a ring reversibly converts a fluorescent structure to a nonfluorescent one.

5. Apparatus as in claim 1, wherein the apparatus further comprises:
   a. an input/output subsystem for providing a data interface between the host computer and the light drive, and for providing an interface to read and write subsystems; the input/output subsystem including a high speed host data interface, and a data formatter/multiplexer;

b. a write subsystem for providing electronic data-to-optical conversion for writing data onto the photoreceptive material, the write subsystem including a plurality of LED arrays or other high density light emitting arrays and write heads having both a plurality of wavelength arrays and a plurality of output intensity levels to encode optical data onto the photoreceptive material;

c. a read subsystem for providing optical-to-electronic data conversion for reading data from the photoreceptive material, the read subsystem including a plurality of high density CCD detector arrays or other high density detector arrays; the detector arrays being wavelength filtered for each band of wavelength detection, and having a plurality of output levels;

d. a storage subsystem for providing optical data storage, the storage subsystem including a spinning disk coated with photoreceptive material, and optionally an uninterruptible power supply; the storage subsystem including the disk, a motor, and a physical mounting assembly for the light drive; and e. a data formatter for buffering data for disassembly and reassembly to/from a read/write system; the data formatter multiplexing data into parallel channels, corresponding to tracks on a disk; the formatter partitioning data bits between wavelength and level prior to optical encoding, and providing massive interconnect to read and write subsystems; and the data formatter having a refresh capability for any destructive-read photoreceptive material.

6. Apparatus for storage of digital data, comprising an encoder subsystem, a read subsystem, and a bus for providing to the subsystem digital input data comprising a plurality of bits, wherein the encoder subsystem provides an optical signal, having multiple wavelengths and multiple brightness levels responsive to the input data, to a selected location in a member comprising photoreceptive material and wherein the read subsystem has receptors that are sensitive to each of the multiple wavelengths and the multiple brightness levels.

7. Apparatus as in claim 5, wherein the member comprising photoreceptive material includes red filtered liquid crystal material, green filtered liquid crystal material, blue filtered liquid crystal material, a sheet of photoreceptive material(s), filtering material, and spacer material.

8. A method of processing digital data and in particular for inputting, storing and outputting data on a photoreceptive material of a light drive, the light drive having a first set of liquid crystals for projecting light of a selected color onto the photoreceptive material of the light drive and having a refraction grating for detecting the wavelength of light incident upon the grating, the drive having a second set of liquid crystals that are clear or opaque to form a routing system under the photoreceptive material, the method comprising (a) inputting data to the light drive by:
  (i) examining the 1's and 0's of the digital data with an encoder and determining the changes to apply to the liquid crystals;
  (ii) tagging the digital data with an address;
  (iii) sending the digital data to the lightdrive through a fiber optic interface; and
  (iv) projecting light of a selected color from the liquid crystals onto the photoreceptive material at the address;

(b) storing the digital data on the light drive by:
  (i) holding a data storage matrix of the photoreceptive material at a threshold by a constant power; and
  (ii) applying light to the data storage matrix of the photoreceptive material at a modulated light brightness intensity; and (c) outputting the digital data from the light drive by:
  (i) applying light that escapes from the second set of liquid crystals to the refraction grating and sensing the wavelength of the applied light; and
  (ii) transmitting the sensed wavelength to a decoder to covert the data to a string of 1's and 0's.

9. Apparatus as in claim 5, wherein the write subsystem further comprises a plurality of parallel tracks (T) at high density spacing (S); a plurality of multiple monochromatic light sources (C) are provided at controlled brightness levels (L bits, or $2^L$ levels) to provide at least a terabyte of storage (T×S×C×L>1 terabyte), the multiple light sources having sufficiently narrow light spectra for separation at L levels, sufficient uniformity to accurately modulate $2^L$ levels, and a high enough switching speed to allow a write throughput of at least about 100 megabytes per second;

wherein the read subsystem further comprises a large plurality of parallel tracks (T) at high density spacing (S), and multiple filtered light detectors (C) with sufficient detection levels to provide at least a terabyte of storage (T×S×C×L>1 terabyte); the multiple filtered detectors having sufficiently narrow light spectra for separation at L levels, with sufficient uniformity and low noise to accurately detect $2^L$ levels, and a high enough sensing speed to allow a read throughput of at least about 100 megabytes per second; and a read head having sufficient sensitivity to read the photoreceptive material output; and wherein the photoreceptive material stores data in data cells therein by retaining the relative wavelengths and brightness levels of light in the photoreceptive material, the photoreceptive material during a write operation receiving multiple colors of light each modulated to one of M levels, each data cell containing multiple bits layered in a plurality of colors, C, each data cell containing $C \log_2(M)$ levels.

* * * * *